US010923122B1

(12) United States Patent
Rozycki et al.

(10) Patent No.: US 10,923,122 B1
(45) Date of Patent: Feb. 16, 2021

(54) PAUSING AUTOMATIC SPEECH RECOGNITION

(71) Applicant: Amazon Technologies, Inc., Seattle, WA (US)

(72) Inventors: Mariusz Rozycki, Gdansk (PL); Aliaksei Kuzmin, Gdansk (PL); Marcin Fuszara, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 16/208,445

(22) Filed: Dec. 3, 2018

(51) Int. Cl.
G10L 15/22 (2006.01)
G10L 15/28 (2013.01)
G06F 3/16 (2006.01)
G10L 15/18 (2013.01)

(52) U.S. Cl.
CPC .............. G10L 15/22 (2013.01); G06F 3/167 (2013.01); G10L 15/18 (2013.01); G10L 15/285 (2013.01); G10L 2015/223 (2013.01); G10L 2015/228 (2013.01)

(58) Field of Classification Search
CPC ....... G10L 15/22; G10L 15/18; G10L 15/285; G10L 2015/223; G10L 2015/228; G06F 3/167
USPC ....................................................... 704/275
See application file for complete search history.

(56) References Cited

U.S. PATENT DOCUMENTS

| 10,102,851 | B1 * | 10/2018 | Kiss ..................... G10L 15/1822 |
| 2005/0071170 | A1 * | 3/2005 | Comerford ............. G10L 15/04 |
| | | | 704/275 |
| 2017/0330555 | A1 * | 11/2017 | Kawano .................. G06F 3/017 |

FOREIGN PATENT DOCUMENTS

WO    WO-2016191352 A1 * 12/2016 ............ G10L 15/08

\* cited by examiner

*Primary Examiner* — Pierre Louis Desir
*Assistant Examiner* — Nicole A Kotulak
(74) *Attorney, Agent, or Firm* — Lee & Hayes, P.C.

(57) ABSTRACT

A speech interface device is configured to process user speech by storing, in volatile memory of the speech interface device, audio data that represents user speech, and inputting first audio data, of the stored audio data, to an automatic speech recognition (ASR) component of the speech interface device, determining that a criterion is satisfied, and, based on the criterion being satisfied, maintaining second audio data in the volatile memory. The ASR component may generate text data based on the first audio data, a natural language understanding (NLU) component of the speech interface device may generate NLU data based on the text data, and, if the NLU data corresponds to a recognized intent, the second audio data may be deleted. Otherwise, speech processing can be resumed by inputting the second audio data to the ASR component.

20 Claims, 5 Drawing Sheets

PAUSING AUTOMATIC SPEECH RECOGNITION

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
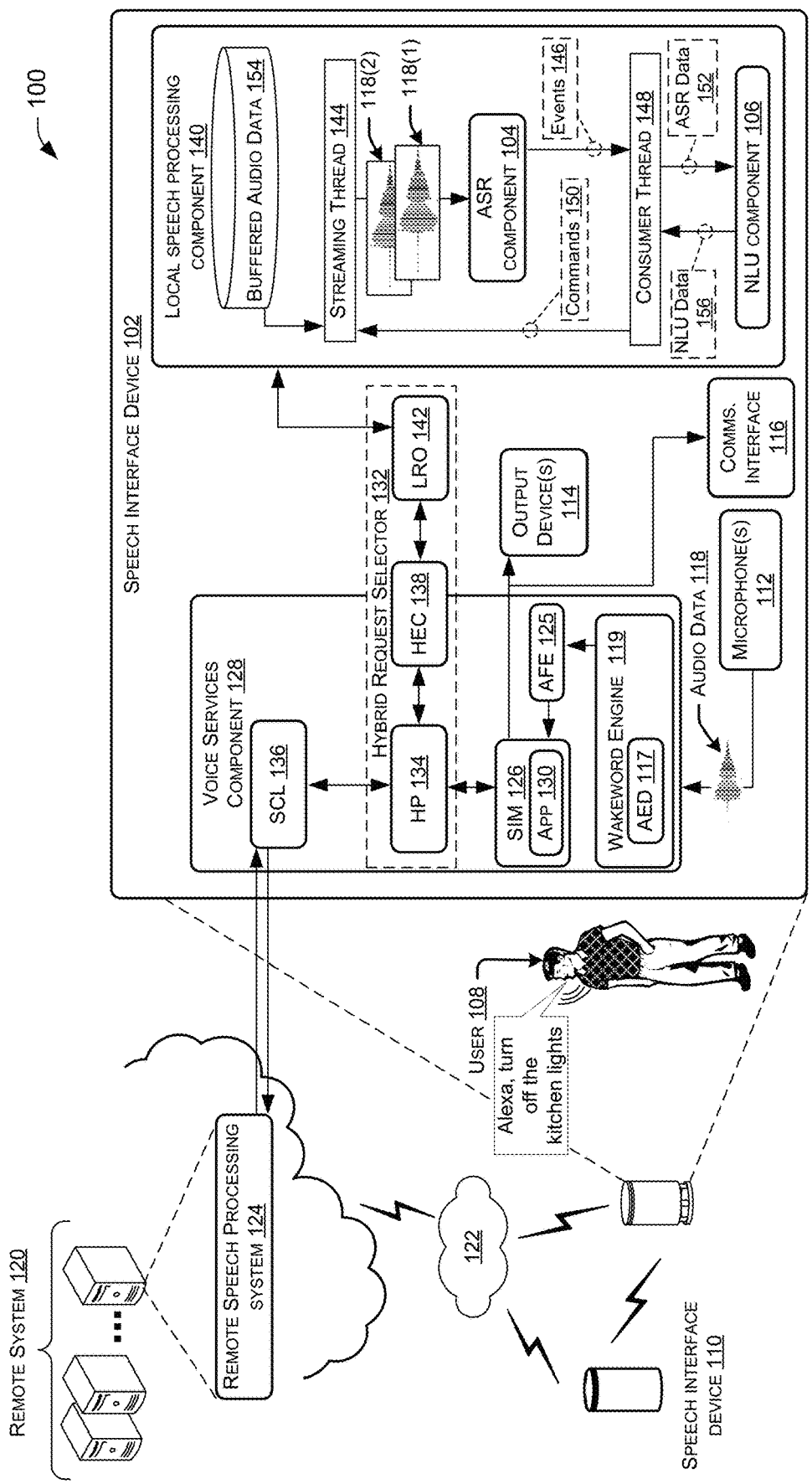
FIG. 1 is a block diagram illustrating a system including a speech interface device that is capable of keeping audio data buffered in order to pause an automatic speech recognition (ASR) component of the speech interface device while a natural language understanding (NLU) component of the speech interface device processes text data to generate NLU data for responding to user speech.

Described herein are, among other things, techniques, devices, and systems, including a speech interface device that is configured to "pause" an automatic speech recognition (ASR) component executing on the speech interface device after the ASR component has ingested audio data representing user speech, and while other local components, including a natural language understanding (NLU) component, process data corresponding to the user speech. Because the local ASR component can utilize a relatively significant amount of computing resources on a low cost speech interface device in the process of generating text data from audio data, the pausing of the ASR component, as described herein, "frees up" the local computing resources for use by other local components of the speech interface device, which would otherwise compete with the ASR component for the local computing resources if the ASR component were not paused. For example, the ASR component may be paused during, or before, a time at which the NLU component is processing text data generated by the ASR component. In this manner, ASR processing no longer occurs in parallel with the NLU processing, and possibly not with other local processing operations that may be computationally-intensive. This means that "non-ASR" processing operations are no longer competing with the ASR component for local computing resources (e.g., processing resources, etc.) of the speech interface device. Accordingly, pausing the ASR component, as described herein, minimizes the congestion on the speech interface device, which mitigates any negative performance impact the ASR component would otherwise have on other components of the speech interface device that are helping to process user speech locally.

In an illustrative example, a speech interface device may reside within an environment (e.g., in a home, automobile, office, hotel, etc.), perhaps along with one or more additional devices (including, for example, other speech interface devices, one or more second devices, such as home automation devices, mobile phone, tablet, TV, wireless speaker, etc.). The speech interface device is configured with "hybrid" functionality, which allows the speech interface device to process user speech locally as well as sending the same audio data (or some derivative thereof) to a remote system for processing. The speech interface device can also be configured to decide on its own and/or be instructed (by the remote system) whether to respond to user speech using response data from a remote speech processing system, or response data from a local speech processing component. This hybrid functionality, allows the speech interface device to respond to user speech, even in instances when a remote system—which, when available, can be used for processing user speech remotely—is, for example, unavailable to, slower than (with network-related latency factored in), or otherwise less preferred than the speech interface device.

The speech interface device may process user speech locally by inputting audio data (that represents the user speech) to a local speech processing component of the speech interface device. This audio data is buffered before it is received by an ASR component executing on the speech interface device. Furthermore, this audio data may be partitioned into audio data samples, and these audio data samples may be input sequentially to the ASR component. Accordingly, first audio data (e.g., one or more first audio data samples) may be received by the ASR component of the speech interface device. After receiving the first audio data by the ASR component, logic of the speech interface device may determine whether a criterion is satisfied for maintaining, in volatile memory of the speech interface device, any forthcoming audio data that has not been received by the ASR component. In some embodiments, this criterion is satisfied subsequent to receiving an event from the ASR component that indicates the ASR component has detected a breakpoint in the first audio data where the user speech has stopped (e.g., the ASR component has detected that the user stopped speaking). If the criterion is satisfied, the speech interface device may maintain, in the volatile memory of the speech interface device, second audio data (e.g., one or more second audio data samples) that represents the user speech and that has not been received by the ASR component. Keeping forthcoming audio data buffered in this manner causes the ASR component to finish processing the audio data that has already been received by the ASR component, at which point the ASR component suspends its processing of audio data altogether because the forthcoming audio data has been kept buffered in lieu of inputting the forthcoming audio data to the ASR component. This technique effectively "pauses" the ASR component by diverting the forthcoming audio data to volatile memory instead of streaming the audio data to the ASR component.

In the meantime, the ASR component generates text data based on the first audio data it already ingested, and this text data may be input to a NLU component executing on the speech interface device. The NLU component may generate NLU data based at least in part on the text data from the ASR component, and depending on the NLU data, logic of the speech interface device may (i) delete the second audio data from the volatile memory, or (ii) resume local speech processing by retrieving the second (buffered) audio data and receiving the second audio data by the ASR component. For example, the second audio data may be deleted from the volatile memory if the NLU data includes intent data that corresponds to a recognized intent. On the other hand, the second (buffered) audio data may be received by the ASR component to resume local speech processing if the NLU data does not include intent data that corresponds to a recognized intent. In the latter scenario, the ASR component generates additional text data, and the NLU component generates additional NLU data.

The techniques and systems described herein may provide various technical benefits. For instance, if and when the local NLU component recognizes an intent, because the ASR component has been paused, the ASR pipeline has already been drained/depleted because the ASR component has already finished processing the audio data that was input to the ASR component by the time the NLU component generates NLU data with a recognized intent. This means that, at the end of an interaction, the ASR component can be shut down substantially instantaneously because the logic of the speech interface device does not have to wait for the ASR component to finish processing audio data in the ASR pipeline before stopping its execution; the ASR component will have already finished its processing by the time the interaction has ended. In addition, pausing the ASR component, as described herein, frees up local computing resources, which allows other components to perform their respective processing tasks faster (without having to compete with the ASR component for local resources), thereby reducing latency. Not only does this affect the latency of local speech processing in isolation, but it also reduces latency with respect to the processing of remote directive data received from a remote speech processing system. This is because local computing resources are tasked with processing the remote directive data when it is received at the speech interface device, and if the remote directive data is received before the local speech processing component finishes processing the user speech locally, the ASR component will have already been paused, and, therefore, the ASR component is not negatively impacting the processing of the remote directive data. Lastly, in the case where the NLU component successfully recognizes an intent and audio data is still stored in the buffer, the techniques and systems described herein conserve local computing resources by discarding/deleting the buffered audio data instead of processing that buffered audio data through the ASR component and the NLU component. That is, the techniques and systems can avoid unnecessarily processing audio data that has no impact on the overall result of the speech recognition.

"Competing," as used herein (e.g., in the context of the previous paragraph), may mean the parallel execution of multiple computer programs called "processes" that are individually made up of multiple threads of execution. "Competing," as used herein (e.g., in the context of the previous paragraph) may additionally, or alternatively, mean the parallel execution of multiple threads of execution such that individual threads utilize computing resources at different times. For instance, a first thread and a second thread may compete for these resources by interleaving their usage of these resources. "Competing," as used herein (e.g., in the context of the previous paragraph) may additionally, or alternatively, mean causing the total resource (e.g., processor resource and/or memory resource) utilization on the speech interface device to exceed a predetermined threshold. For example, if, when performing ASR processing operations, the total processor and/or memory utilization on the speech interface device would exceed a predetermined threshold percentage, which is likely to add latency to other processes (namely those processing operations that are currently running and that consume or utilize, on average, a particular percentage of the total processing and/or memory resources), the ASR processing operations can be considered to be "competing" with these other processing operations. If, on the other hand, when performing the ASR processing operations, the total processor utilization on the speech interface device would not exceed a predetermined threshold, there may be enough available local resources for the ASR processing operations and other processing operations to perform their respective tasks without adding latency to the other processing operations. In this latter case, the ASR processing operations would not be considered to be competing with these other processing operations. A "computationally-intensive processing operation," as used herein, means a processing operation that consumes or utilizes, on average, a percentage of the total processing and/or memory resources of the speech interface device that is above a predetermined threshold percentage and/or that takes a particular amount of time to complete.

FIG. 1 is a block diagram illustrating a system 100 including a speech interface device 102 that is capable of buffering audio data to pause an automatic speech recognition (ASR) component 104 of the speech interface device 102 while a natural language understanding (NLU) component 106 of the speech interface device 102 processes text data to generate NLU data for responding to user speech. This "pausing" of the ASR component, among other technical benefits, frees up local computing resources (e.g., processing resources, etc.) for use by other components of the speech interface device 102, such as the NLU component 106. Freeing up local resources before speech processing is finished causes a reduction in latency, which improves the user experience with the speech interface device 102.

The speech interface device 102 may be located within an environment to provide various capabilities to a user 108, when the user 108 is also in the environment. The environment in which the speech interface device 102 is located may be a home or other premises, an automobile, or any similar environment. Such an environment may include other devices including additional speech interface devices, such as the speech interface device 110, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 112, and responding in various ways, such as by outputting content via an output device(s) 114, which may be a speaker(s), a display(s), or any other suitable output device 114. In addition, the speech interface device 102 may be configured to respond to user speech by controlling second devices that are collocated in the environment with the speech interface device 102, such as by sending a command to a second device via a communications interface 116 (e.g., a short range radio), the command instructing an operation to be performed at the second device (e.g., to turn on a light in the environment). FIG. 1 also shows that, in addition to using the microphone(s) 112 to capture utterances and convert them into digital audio data 118, the speech interface device 102 may additionally, or alternatively, receive audio data 118 (e.g., via the communications interface 116) from another speech interface device 110 in the environment, such as when the other speech interface device 110 captures an utterance from the user 108 and sends the audio data 118 to the speech interface device 102. This may occur in situations where the other speech interface device 110 is closer to the user 108 and would like to leverage the "hybrid" capabilities of the speech interface device 102.

Under normal conditions, the speech interface device 102 may operate in conjunction with and/or under the control of a remote, network-based or network-accessible control system 120 (abbreviated to "remote system" 120 in FIG. 1). The remote system 120 may, in some instances be part of a network-accessible computing platform that is maintained and accessible via a wide area network 122. Network-accessible computing platforms such as this may be referred to using terms such as "on-demand computing", "software as a service (SaaS)", "platform computing", "network-accessible platform", "cloud services", "data centers", and so forth. The remote system 120 may be configured to provide particular functionality to large numbers of local (e.g., in-home, in-car, etc.) devices of different users. The wide area network 122 is representative of any type of public or private, wide-area network, such as the Internet, which extends beyond the environment of the speech interface device 102. Thus, the wide area network 122 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The term "local" is used herein as an adjective that describes a common attribute of devices, components, processing operations, and resources (e.g., computing resources, such as processing resources, memory resources, networking resources, etc.). As used herein, a "local" device, component, processing operation, and/or resource can be one that is located, or performed, in the environment of the speech interface device 102. By contrast, a device, component, processing operation, and/or resource that is located, or performed, at a geographically remote location, such as the geographically remote location of the remote system 120, is not considered to be a "local" device, component, processing operation, and/or resource. Thus, a "local" component may be a physical, logical and/or functional component of the speech interface device 102 itself, or a physical, logical and/or functional component that is located in the environment of the speech interface device 102 and is in communication (e.g., in short-range wired or wireless communication) with the speech interface device 102. A contrasting example is a component of a server that is located at a geographically remote location and is part of the remote system 120; such a component is not considered a "local" component, as the term "local" is used herein. A "local" device can be a device that is located in the environment of the speech interface device 102. For instance, the second speech interface device 110 shown in FIG. 1 is an example of a local device. Similarly, a pair of electronic ear buds that are worn by the user 108 in the vicinity of (e.g., less than a threshold distance from) the speech interface device 102, or a mobile phone carried by the user 108 in the vicinity of the speech interface device 102, are each considered to be an example of a "local" device. When processing operations are described herein as being performed "locally," this means that they are performed at least in part by the speech interface device 102 and/or a component thereof. However, this does not preclude the possibility that another local component and/or device that is located in the environment of the speech interface device 102 may perform some of those "locally-performed" processing operations using its own resources, and/or using the resources of the speech interface device 102. In some embodiments, "local" processing operations are operations performed exclusively by the speech interface device 102. In some embodiments, a "local" device means exclusively the speech interface device 102 and does not include devices that are external or peripheral to the speech interface device 102. That is, local processing may comprise processing that is done within a common environment but across multiple collocated devices, while in other instances local processing may be done within a single device.

In some embodiments, the remote system 120 may be configured to receive audio data 118 from the speech interface device 102, to recognize speech in the received audio data 118 using a remote speech processing system 124, and to perform functions in response to the recognized speech. In some embodiments, these functions involve sending directives, from the remote system 120, to the speech interface device 102 to cause the speech interface device 102 to perform an action, such as output an audible response to the user speech via a speaker(s) (i.e., an output device(s) 114), and/or control second devices in the environment by sending a control command via the communications interface 116. Thus, under normal conditions, when the speech interface device 102 is able to communicate with the remote system 120 over a wide area network 122 (e.g., the Internet), some or all of the functions capable of being performed by the remote system 120 may be performed by sending a directive(s) over the wide area network 122 to the speech interface device 102, which, in turn, may process the directive(s) for performing an action(s). For example, the remote system 120, via a remote directive that is included in remote response data, may instruct the speech interface device 102 to output an audible response (e.g., using text-to-speech (TTS)) to a user's question, to output content (e.g., music) via a speaker of the speech interface device 102, and/or to turn on/off a light in the environment. It is to be appreciated that the remote system 120 may be configured to provide other functions in addition to those discussed herein, such as, without limitation, providing step-by-step directions for navigating from an origin to a destination location, conducting an electronic commerce transaction on behalf of the user 108 as part of a shopping function, establishing a communication session between the user 108 and another user, and so on.

A home automation example is shown in FIG. 1 by the user 108 uttering the expression "Alexa, turn off the kitchen lights." Whether this utterance is captured by the microphone(s) 112 of the speech interface device 102 or captured by another speech interface device 110 in the environment, the audio data 118 representing this user's speech is ultimately received by a wakeword engine 119 of a voice services component 128 executing on the speech interface device 102. The wakeword engine 119 may be configured to compare the audio data 118 to stored models used to detect a wakeword (e.g., "Alexa") that indicates to the speech interface device 102 that the audio data 118 is to be processed for determining an intent (a local NLU result). Thus, the wakeword engine 119 is configured to determine whether a wakeword is detected in the audio data 118, and, if a wakeword is detected, the wakeword engine 119 can proceed with routing the audio data 118 to an audio front end (AFE) 125 of the voice services component 128. If a wakeword is not detected in the audio data 118, the wakeword engine 119 can refrain from sending the audio data 118 to the AFE 125, thereby preventing the audio data 118 from being further processed. The audio data 118 can be discarded in this situation.

In some embodiments, the wakeword engine 119 may include an acoustic event detector (AED) 117. The AED 117 may be configured to compare the audio data 118 to stored models used to detect an acoustic or audio event that indicates to the speech interface device 102 that the audio data 118 is to be processed for determining an intent for the detected audio event. An example of an audio event might be the sound of a hand clap, the sound of breaking glass, the sound of a baby crying, or the like, that is detected in the audio data 118. In other words, the AED 117 is configured to detect non-speech events in the audio data 118.

The AFE 125 (sometimes referred to as acoustic front end (AFE) 125) of a voice services component 128 executing on the speech interface device 102. The AFE 125 is configured to transform the audio data 118 from the wakeword engine 119 into data for processing by the ASR component 104 and/or the NLU component 106. The AFE 125 may reduce noise in the audio data 118 and divide the digitized audio data 118 into frames representing a time intervals for which the AFE 125 determines a number of values, called features, representing the qualities of the audio data 118, along with a set of those values, called a feature vector, representing the features/qualities of the audio data 118 within the frame. Many different features may be determined, and each feature represents some quality of the audio data 118 that may be useful for ASR processing and/or NLU processing. A number of approaches may be used by the AFE 125 to process the audio data 118, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 125 is configured to use beamforming data to process the received audio data 118. Beamforming can be used to distinguish between the directions from which speech and noise originate. Accordingly, the microphones 112 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 118, used by the AFE 125 in beamforming, may be determined based on results of the wakeword engine's 119 processing of the audio data 118. For example, the wakeword engine 119 may detect the wakeword in the audio data 118 from a first microphone 112 at time, t, while detecting the wakeword in the audio data 118 from a second microphone 112 a millisecond later in time (e.g., time, t+1 millisecond), and so on and so forth, for any suitable number of audio signals corresponding to multiple microphones 112 in a microphone array.

A speech interaction manager (SIM) 126 of the voice services component 128 may receive the audio data 118 that has been processed by the AFE 125. The SIM 126 may manage received audio data 118 by processing utterances as events, and the SIM 126 may also manage the processing of directives that are used to respond to the user speech (e.g., by controlling the action(s) of the speech interface device 102). The SIM 126 may include one or more client applications 130 or skills for performing various functions at the speech interface device 102.

A hybrid request selector 132 (or, hybrid request selector component 132) of the speech interface device 102 is shown as including a hybrid proxy (HP) 134 (or, hybrid proxy (HP) subcomponent 134), among other subcomponents. The HP 134 can be implemented as a layer within the voice services component 128 that is located between the SIM 126 and a speech communication library (SCL) 136, and may be configured to proxy traffic to/from the remote system 120. For example, the HP 134 may be configured to pass messages between the SIM 126 and the SCL 136 (such as by passing events and directives there between), and to send messages to/from a hybrid execution controller (HEC) 138 (or, hybrid execution controller (HEC) subcomponent 138) of the hybrid request selector 132. For instance, directive data received from the remote system 120 can be sent to the HEC 138 using the HP 134, which sits in the path between the SCL 136 and the SIM 126. The HP 134 may also be configured to allow audio data 118 received from the SIM 126 to pass through to the remote speech processing system 124 (via the SCL 136) while also receiving (e.g., intercepting) this audio data 118 and sending the received audio data to the HEC 138 (sometimes via an additional SCL).

A local speech processing component 140 (sometimes referred to as a "speech processing component" 140, or a "spoken language understanding (SLU) component" 140) is configured to process audio data 118 representing user speech. In some embodiments, the hybrid request selector 132 may further include a local request orchestrator (LRO) 142 (or, local request orchestrator (LRO) subcomponent) of the hybrid request selector 132. The LRO 142 is configured to notify the local speech processing component 140 about the availability of new audio data 118 that represents user speech, and to otherwise initiate the operations of the local speech processing component 140 when new audio data 118 becomes available. In general, the hybrid request selector 132 may control the execution of the local speech processing component 140, such as by sending "execute" and "terminate" events/instructions to the local speech processing component 140. An "execute" event may instruct the local speech processing component 140 to continue any suspended execution based on audio data 118 (e.g., by instructing the local speech processing component 140 to execute on a previously-determined intent in order to generate a directive). Meanwhile, a "terminate" event may instruct the local speech processing component 140 to terminate further execution based on the audio data 118, such as when the speech interface device 102 receives directive data from the remote system 120 and chooses to use that remotely-generated directive data.

In the example of FIG. 1, where the user 108 utters the expression "Alexa, turn off the kitchen lights," the audio data 118 is received by the SIM 126 of the voice services component 128. The SIM 126 may send the audio data 118 through the HP 134, and the HP 134 may allow the audio data 118 to pass through to the remote speech processing system 124 via the SCL 136, and the HP 134 may also input the audio data 118 to the local speech processing component 140 by routing the audio data 118 through the HEC 138 of the hybrid request selector 138, whereby the LRO 142 notifies the local speech processing component 140 of the incoming audio data 118. At this point, the hybrid request selector 132 may wait for response data from either or both of the remote system 120 or the local speech processing component 140.

The local speech processing component 140 is configured to receive the audio data 118 from the hybrid request selector 132 as input, to recognize speech in the audio data 118, to determine user intent from the recognized speech, and to determine how to act on the user intent by generating directive data. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local speech processing component 140 (and/or the remote speech processing system 124) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 122. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive In some embodiments, the speech interface device 102 may be configured to compare the audio data 118 to stored models used to detect a wakeword (e.g., "Alexa") that indicates to the speech interface device 102 that the audio data 118 is to be processed for determining an intent (a local NLU result). In some embodiments, the hybrid request selector 132 may send the audio data 118 to a wakeword engine (See FIG. 5), which determines whether a wakeword is detected in the audio data 118, and, if a wakeword is detected, this indication may be provided to the hybrid request selector 132 so that the hybrid request selector 132 can proceed with routing the audio data 118 to the remote speech processing system 124 while the local speech processing component 140 processes the audio data 118 in parallel. If a wakeword is not detected in the audio data 118, this indication may be provided to the hybrid request selector 132 so that the hybrid request selector 132 can refrain from sending the audio data 118 to the remote speech processing system 124, and to prevent the local speech processing component 140 from further processing the audio data 118, which does not include the wakeword. The audio data 118 can be discarded in this situation.

As mentioned, the local speech processing component 140 may include an ASR component 104 (or, ASR subcomponent 104) that is configured to perform ASR processing on the audio data 118 to convert the audio data 118 into text data (sometimes referred to herein as "ASR text data," an "ASR result", or "ASR data"). ASR transcribes audio data 118 into text data representing the words of the user speech contained in the audio data 118. A spoken utterance in the audio data 118 can be input to the ASR component 104, which then interprets the utterance based on the similarity between the utterance and pre-established language models available to the local speech processing component 140. For example, the ASR component 104 may compare the input audio data 118 with models for sounds (e.g., subword units or phonemes) and sequences of sounds to identify words that match the sequence of sounds spoken in the utterance of the audio data 118. In some embodiments, the ASR component 104 outputs the most likely text recognized in the audio data 118, or multiple hypotheses in the form of a lattice or an N-best list with individual hypotheses corresponding to confidence scores or other scores (such as probability scores, etc.). In some embodiments, the ASR component 104 is customized to the user 108 (or multiple users) who created a user account to which the speech interface device 102 is registered. For instance, the language models (and other data) used by the ASR component 104 may be based on known information (e.g., preferences) of the user 108, and/or on a history of previous interactions with the user 108.

As mentioned, the local speech processing component 140 may also include a NLU component 106 (or, NLU subcomponent 106) that performs NLU processing on the generated ASR text data to determine intent data and/or slot data (referred to herein as a "NLU result", or "NLU data") so that directives may be determined based on the intent data and/or the slot data. Generally, the NLU component 106 takes textual input (such as text data generated by the ASR component 104) and attempts to make a semantic interpretation of the ASR text data. That is, the NLU component 106 determines the meaning behind the ASR text data based on the individual words, and then the NLU component 106 can implement that meaning. The NLU component 106 interprets a text string to derive an intent or a desired action or operation from the user 108. This may include deriving pertinent pieces of information in the text that allow the NLU component 106 to identify a second device in the environment, if the user, for example, intends to control a second device (e.g., a light(s) in the user's 108 house, as is the case in the example of FIG. 1). The local speech processing component 140 may also provide a dialog management function to engage in speech dialogue with the user 108 to determine (e.g., clarify) user intents by asking the user 108 for information using speech prompts. In some embodiments, the NLU component 106 is customized to the user 108 (or multiple users) who created a user account to which the speech interface device 102 is registered. For instance, data used by the NLU component 106 to understand the meaning of ASR text may be based on known information (e.g., preferences) of the user 108, and/or on a history of previous interactions with the user 108.

In some embodiments, one or more subcomponents of the local speech processing component 140 may utilize "artifacts." An "artifact," as used herein, means compiled data that is executable by one or more subcomponents of the local speech processing component 140 when responding to user speech. Examples of artifacts include, without limitation, ASR models (e.g., acoustic models, language models, etc.), NLU models (e.g., grammar models), entity resolution (ER) data (e.g., lexical data, including association data that associates names of entities with canonical identifiers of those entities, etc.), and/or TTS voice files. In some embodiments, the compiled form of an artifact includes a finite state transducer (FST) that is usable, by one or more subcomponents of the local speech processing component 140, to process user speech. A FST may include a compressed graph structure that relates to words and/or phrases (e.g., names of entities, expressions of intent, etc.).

In some embodiments, the local speech processing component 140 may also include, or be configured to use, one or more installed speechlets. Speechlets may represent domains that are used in order to determine how to act on an utterance in a particular way, such as by outputting a directive that corresponds to the determined intent, and which can be processed to implement the desired operation. Accordingly, the term "speechlet" may be used interchangeably herein with the term "domain" or "domain implementation." The speechlets installed on the speech interface device 102 may include, without limitation, a music speechlet (or music domain) to act an utterances with intents to play music on a device, such as via a speaker(s) of the speech interface device 102, a navigation speechlet (or a navigation domain) to act on utterances with intents to get directions to a point of interest with a known address, a shopping speechlet (or shopping domain) to act on utterances with intents to buy an item from an electronic marketplace, and/or a device control speechlet (or device control domain) to act on utterances with intents to control a second device(s) in the environment.

In order to generate a particular interpreted response, the NLU component 106 may apply grammar models and lexical information associated with the respective domains or speechlets to recognize one or more entities in the text of the query. In this manner the NLU component 106 may identify "slots" (i.e., particular words in query text) that may be needed for later command processing. Depending on the complexity of the NLU component 106, it may also label each slot with a type of varying levels of specificity (such as noun, place, city, artist name, song name, device name, or the like). Each grammar model used by the NLU component 106 may include the names of entities (i.e., nouns) commonly found in speech about the particular domain (e.g., generic terms), whereas the lexical information (e.g., from a gazetteer) is personalized to the user(s) and/or the device. For instance, a grammar model associated with the navigation domain may include a database of words commonly used when people discuss navigation.

Accordingly, the intents identified by the NLU component 106 may be linked to domain-specific grammar frameworks with "slots" or "fields" to be filled (e.g., resolved). Each slot/field corresponds to a portion of the query text that the system believes corresponds to a named entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make slot resolution more flexible, these frameworks would ordinarily not be structured as sentences, but rather based on associating slots with grammatical tags.

For example, the NLU component 106 may parse the query to identify words as subject, object, verb, preposition, etc., based on grammar rules and/or models, prior to recognizing named entities. The identified verb may be used by the NLU component 106 to identify an intent, which is then used to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 106 may then search the corresponding fields in the domain-specific and personalized lexicon(s), attempting to match words and phrases in the query tagged as a grammatical object or object modifier with those identified in the database(s).

After determining local intent data, or failing to do so, the local speech processing component 140 may send response data to the hybrid request selector 132, such as a "Ready-ToExecute" response, which can indicate that the local speech processing component 140 has recognized an intent, or that the local speech processing component 140 is ready to communicate failure (if the local speech processing component 140 could not recognize an intent via the NLU component 106). The hybrid request selector 132 may then determine whether to use directive data from the local speech processing component 140 to respond to the user speech, or whether to use directive data received from the remote system 120, assuming a remote response is even received (e.g., when the speech interface device 102 is able to access the remote speech processing system 124 over the wide area network 122). In a scenario where the hybrid request selector 132 chooses remote directive data to respond to user speech, the microphone(s) 112 may be closed so that no more audio data is processed through the local speech processing component 140, and the local speech processing component 140 finishes processing whatever audio data it has already ingested.

When audio data 118 representing user speech is processed locally on the speech interface device 102, the LRO 142 can notify the local speech processing component 140 that an interaction has started, and the audio data 118 can be input to the local speech processing component 140. As shown in FIG. 1, the local speech processing component 140 may buffer the audio data 118 as buffered audio data 154 before that audio data is input to the ASR component 104. This may be accomplished by storing the audio data 118 in volatile memory, such as a volatile memory buffer (e.g., a dynamic random-access memory (DRAM) buffer), of the speech interface device 102. Such a volatile memory buffer can include any suitable form of volatile memory (e.g., volatile RAM) that is not used for persistent storage of data, but is used to temporarily store data until it is used, transmitted, deleted, and/or stored persistently. The local speech processing component 140 may also invoke a streaming thread 144 that is executed on one or more processors of the speech interface device 102 to stream (or otherwise input) the incoming audio data 118 (representing the user speech) to the ASR component 104. As mentioned, audio data 118 that has been buffered as the buffered audio data 154 may be partitioned into multiple audio data samples, and these audio data samples may be input sequentially to the ASR component 104. For example, a single utterance (e.g., "Alexa, turn off the kitchen lights") captured by a microphone(s) 112 of the speech interface device 102 can be digitized into audio data 118, and this audio data 118 may be partitioned into multiple audio data samples, such as a first audio data sample 118(1), a second audio data sample 118(2), etc. The samples of audio data 118 may be partitioned based on an amount of data (e.g., each sample may be a particular number of bytes, representing a few milliseconds of audio, such as 5 milliseconds (ms), 10 ms, 15 ms, or any other suitable apportionment of the audio data 118). Collectively, these audio data samples 118(1), 118(2), etc., may representative a single utterance or multiple utterances, such as when the user speaks a first utterance, then pauses momentarily, and then speaks a second utterance.

Initially, the streaming thread 144 is configured to automatically input audio data samples to the ASR component 104 as long as audio data samples are received from the hybrid request selector 132 and buffered as the buffered audio data 154. The ASR component 104 is configured to perform ASR processing on the audio data samples it receives from the streaming thread 144, and to emit events 146 (event data) that vary in type. For example, the ASR component 104 may emit a first type of event 146 (e.g., a "StartOfSpeech" event) that indicates the ASR component 104 has detected a point in the audio data 118 where the user speech has started (e.g., the ASR component 104 has detected that the user started speaking). The ASR component 104 may additionally, or alternatively, emit another type of event 146 (e.g., an "EndOfSpeech" event) that indicates the ASR component 104 has detected a breakpoint in the audio data 118 where the user speech has stopped (e.g., the ASR component 104 has detected that the user stopped speaking). The ASR component 104 may use any suitable endpointing model for this purpose. In some embodiments, the ASR component 104 may analyze the frequencies of the audio data 118 to determine a frequency range that corresponds to a human voice, and may determine the breakpoint based at least in part on pause durations in that frequency range of the voice being analyzed. The ASR component 104 may additionally, or alternatively, emit yet another type of event 146 (e.g., a "RecognitionResult" event) that includes text data and that indicates the ASR component 104 has recognized user speech in the audio data 118.

In response to the LRO 142 notifying the local speech processing component 140 that an interaction has started, the local speech processing component 140 may also invoke a consumer thread 148 that is executed on one or more processors of the speech interface device 102 to receive the events 146 (event data) emitted (or output) from the ASR component 104, and to respond in various ways (e.g., by sending commands 150 to the streaming thread 144, and/or by forwarding ASR data 152 to the NLU component 106, etc.) depending on the type of event 146 received from the ASR component 104. Although the order in which the streaming thread 144 and the consumer thread 148 are invoked can vary by implementation, in some embodiments, the consumer thread 148 is invoked before the streaming thread 144 is invoked. It is to be appreciated the streaming thread 144 and the consumer thread 148 are examples of threads of execution. A "process" is an instance of a computer program. A process may be made up of multiple threads of execution that execute instructions concurrently. Accordingly, the streaming thread 144 and the consumer thread 148 may execute concurrently, and they may be part of the same process, or they may be parts of different processes. The streaming thread 144 and the consumer thread 148 may execute concurrently using a parallel multithreading implementation, or a processor(s) of the speech interface device 102 may execute each of these threads using time slicing, where the processor switches between executing the streaming thread 144 and the consumer thread 148. Multiple threads may also share memory resources of the speech interface device 102. Threads can be used to divide (sometimes referred to as "split") a computer program into two or more executing tasks. In this sense, a thread can be contained inside of a process, and different threads in the same process may share the same resources.

In response to receiving an EndOfSpeech event 146 that indicates the ASR component 104 has detected a breakpoint in the audio data 118 where the user speech has stopped (e.g., the ASR component 104 has detected that the user stopped speaking), the consumer thread 148 may send a command 150 to the streaming thread 144 to pause (or cease or suspend until further notice) streaming of the audio data 118 to the ASR component 104. In response to the streaming thread 144 receiving the command 150 to pause the streaming of the audio data 118 to the ASR component 104, the ASR component 104 finishes any ASR processing remaining in the ASR pipeline, and any forthcoming audio data 118 (e.g., additional audio data samples) that has not been input to the ASR component 104 is kept buffered, in a volatile memory buffer of the speech interface device 102, as the buffered audio data 154, in lieu of streaming that forthcoming audio data 118 to the ASR component 104. In the example described above, the receipt, by the consumer thread 148, of an EndOfSpeech event 146 is an example of a satisfaction of a criterion for keeping (or maintaining) any forthcoming audio data 118 in the volatile memory buffer of the speech interface device 102 in lieu of streaming the audio data 118 to the ASR component 104, which effectively "pauses" the ASR component 104 after the ASR component 104 finishes processing audio data it has already ingested. That is, in the illustrative example described above, the logic of the speech interface device 102 waits until the user stops speaking, and, in response to detecting that the user stopped speaking, the streaming of any forthcoming audio data 118 to the ASR component 104 is "paused," and this forthcoming audio data 118 (which has not been input to the ASR component 104) is kept buffered in the volatile memory buffer of the speech interface device 102 until the logic determines whether to use the buffered audio data 154 or discard it, depending on NLU data 156 that is output by the NLU component 106. It is to be appreciated, however, other criteria, besides an EndOfSpeech event 146, may be used for determining whether to keep forthcoming audio data buffered in lieu of streaming the audio data to the ASR component 104. For instance, the criterion for keeping forthcoming audio data buffered may be satisfied at another point in time that is earlier than the receipt of the EndOfSpeech event 146 at the consumer thread 148. For example, logic of the ASR component 104 may be configured to immediately notify the streaming thread 144 upon the ASR component 104 determining a breakpoint in the audio data where the user speech has stopped—without waiting for the consumer thread 148 to receive an EndOfSpeech event 146 and to send a corresponding "pause" command to the streaming thread 144 in response.

The size of the volatile memory (e.g., the volatile memory buffer) that maintains the buffered audio data 154 may not be artificially limited other than by the amount of available memory on the speech interface device 102. Because it is likely that the ASR component 104 will be paused for, at most, 200 milliseconds (ms) at any given time during any local speech processing session, the speech interface device 102 is likely to possess a sufficient amount of volatile memory to maintain the buffered audio data 154 during such a timeframe. In some embodiments, the amount of available volatile memory on the speech interface device 102 may be sufficient to buffer at least 50 seconds of audio data, and oftentimes more than 50 seconds of audio data. It is also to be appreciated that the buffered audio data 154 may be buffered in a secure portion of memory on the speech interface device 102, such as a portion of memory that is protected from illicit access by a firewall, by encryption, or by other means of securely storing data.

Continuing with reference to FIG. 1, after the consumer thread 148 sends the "pause" command 150 to the streaming thread 144, the consumer thread 148 may receive an additional event 146 (e.g., a "RecognitionResult" event) that includes text data and that indicates the ASR component 104 has recognized user speech in the audio data 118. The ASR data 152 shown in FIG. 1 may represent this text data. Accordingly, in response to receiving, from the ASR component 104, the RecognitionResult event 146 that includes the ASR data 152 (e.g., text data), the consumer thread 148 may input the ASR data 152 to the NLU component 106. The NLU component 106 may generate NLU data 156 based on the ASR data 152 by performing NLU processing on the ASR data 152 (e.g., text data). If the NLU component 106 is able to recognize an intent, the NLU data 156 may include intent data corresponding to the recognized intent. If the NLU component 106 is unable to recognize an intent, the NLU data 156 may correspond to a failure to recognize an intent. The consumer thread 148 is configured to respond differently in these two scenarios.

In a first scenario, if the consumer thread 148 determines that the NLU data 156 does not include intent data that corresponds to a recognized intent, the consumer thread 148 may send a command 150 to the streaming thread 144 to resume the streaming of the audio data 118 to the ASR component 104. In response to the streaming thread 144 receiving the "resume" command 150 to resume the streaming of the audio data 118 to the ASR component 104, the buffered audio data 154 may be retrieved from the volatile memory buffer of the speech interface device 102, and the retrieved audio data may be input to the ASR component 104. In other words, the streaming thread 144 resumes the streaming of the audio data 118 to the ASR component 104 by picking up from where it left off; starting with the audio data 118 that has been buffered the longest as buffered audio data 154. Because ASR processing of the buffered audio data occurs faster than real-time, the speech interface device 102 can "catch up" with real-time audio data that has not yet been buffered in the volatile memory buffer, and local speech processing does not exhibit any latency as a result of waiting to process the buffered audio data 154. Accordingly, the buffered audio data 154 is maintained in the volatile memory buffer of the speech interface device 102 much like a data queue where audio data samples (e.g., bytes of audio data) are maintained in an ordered queue. Incoming audio data generated from utterances captured by the microphone(s) 112 is placed at the end of the queue, and, when streaming to the ASR component 104 is resumed, the streaming thread 144 can retrieve the buffered audio data 154 from the beginning of the queue. This ensures that speech processing resumes from where it left off by streaming the audio data 118 that has been buffered the longest to the ASR component 104 first (in the order in which the audio data samples were received via the hybrid request selector 132).

The "pausing" of the ASR component 104 may iterate (e.g., resume, then pause for a second time) after inputting the next audio data sample(s) to the ASR component 104. For instance, the consumer thread 148 may receive an EndOfSpeech event 146 from the ASR component 104, send a "pause" command 150 to the streaming thread 144 (in order to pause the streaming of any forthcoming audio data 118 to the ASR component 104), receive a RecognitionResult event 146 with ASR data 152 (e.g., text data) from the ASR component 104, input the ASR data 152 to the NLU component 106, and receive NLU data 156 from the NLU component 106. If the consumer thread 148 determines that the NLU data 156 includes intent data that corresponds to a recognized intent, the consumer thread 148 may send a command 150 to the streaming thread 144 to stop the streaming of the audio data 118 to the ASR component 104. As used herein "stopping" the streaming can be distinguished from "pausing" or "suspending" the streaming, because the former stops the streaming altogether, while the latter suspends or halts the streaming until further notice (e.g., until the consumer thread 148 says to resume the streaming or stop the streaming). In response to the streaming thread 144 receiving the command 150 to stop the streaming of the audio data 118 to the ASR component 104, any buffered audio data 154 remaining in the volatile memory buffer of the speech interface device 102 may be deleted (or discarded) by clearing the buffer. A speech recognition result (e.g., local response data) can be output by the local speech processing component 140 based on the "intentful" NLU data 156, local directive data can be generated based on the "intentful" NLU data 156, and the hybrid request selector 132 can choose between the local directive data or a remote directive data (assuming remote directive data was received from the remote speech processing system 124 over the network 122).

As mentioned, the techniques and systems described herein for buffering audio data to effectively "pause" the ASR component 104 may provide various technical benefits. For instance, once the NLU component 106 is able to recognize an intent, because the ASR component 104 has been paused, the ASR pipeline has already been drained/depleted because the ASR component 104 will have already finished processing the audio data 118 that was input to the ASR component 104 by the time the NLU component 106 generates NLU data 156 with a recognized intent. This means that, at the end of an interaction, the ASR component 104 can be shut down (e.g., by stopping its execution) substantially instantaneously because the logic of the speech interface device 102 does not have to wait for the ASR component 104 to finish processing audio data 118 in the ASR pipeline; it will have already finished its processing by the time the interaction has ended. In addition, pausing the ASR component 104, as described herein, frees up local computing resources, which allows other components (e.g., the NLU component 106, the hybrid request selector 132, etc.) to perform their respective processing tasks faster, thereby reducing latency of processing speech. Not only does this affect local speech processing in isolation, but it also reduces latency with respect to the processing of remote directive data received from the remote speech processing system 124, because the processing of that remote directive data utilizes local computing resources of the speech interface device 102 as well, and if the remote directive data is received before the local speech processing component 140 finishes processing the user speech locally, the ASR component 104 is no longer competing with the processing of the remote directive data. Lastly, in the case where the NLU component 106 recognizes an intent with buffered audio data 154 (unprocessed by the ASR component 104) still stored in the volatile memory buffer of the speech interface device 102, the techniques and systems described herein conserve local computing resources by discarding the buffered audio data 154 instead of processing the buffered audio data 154 through the ASR component 104 and the NLU component 106. That is, the techniques and systems can avoid processing audio data that has no impact on the overall result of the speech recognition.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
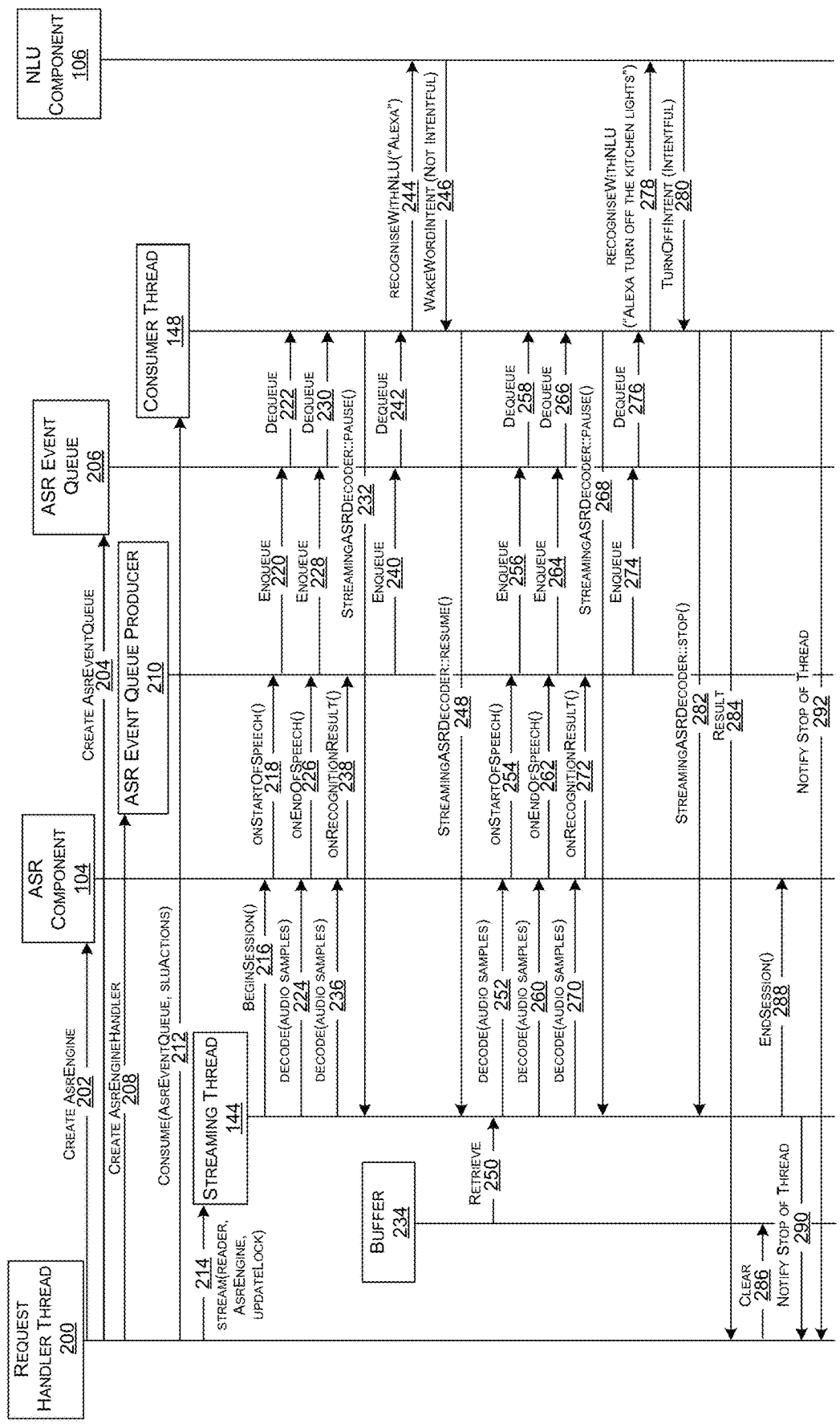
FIG. 2 is a diagram illustrating example signaling between executing components and threads of a speech interface device while processing user speech, FIG. 2 illustrating an example technique for pausing an ASR component of the speech interface device while a NLU component of the speech interface device processes text data to generate NLU data.

FIG. 2 is a diagram illustrating example signaling between executing components and threads of a speech interface device 102 while processing user speech. FIG. 2 illustrates an example technique for pausing an ASR component 104 of the speech interface device 102 while a NLU component 106 of the speech interface device 102 processes text data (ASR data 152) to generate NLU data 156.

The signaling shown in FIG. 2 may start with a request handler thread 200 executing on one or more processors of the speech interface device 102. The request handler thread 200 may be invoked by the local speech processing component 140 (or SLU component 140), which orchestrates the interaction between the ASR component 104 and the NLU component 106 (e.g., by making calls to those components). The invocation of the request handler thread 200 may be in response to the local speech processing component 140 receiving a notification from the LRO 142 that an interaction has started and that audio data 118 representing user speech is available for processing.

The request handler thread 200 may be implemented as an application programming interface (API) method that requests the local speech processing component 140 to provide the raw audio stream (audio data 118), which may be received in any suitable format (e.g., a .wav file). At 202, the request handler thread 200 may invoke the ASR component 104 (e.g., via a "create AsrEngine" call), which causes the ASR component 104 to begin its execution for generating ASR data 152 for a new interaction. At 204, the request handler thread 200 may invoke an ASR event queue 206 (e.g., via a "create AsrEventQueue" call), the ASR event queue 206 configured to queue events 146 (event data) that are output by the ASR component 104 and to provide the consumer thread 148 access to those queued events 146. At 208, the request handler thread 200 may invoke an ASR event queue producer 210 (e.g., via a "create AsrEngineHandler" call), the ASR event queue producer 210 configured to manage the events 146 (event data) output from the ASR component 104 and to enqueue the events 146 in the ASR event queue 206.

At 212, the request handler thread 200 may invoke the consumer thread 148 (e.g., via a "consume(AsrEventQueue, sluActions)" call), the consumer thread 148 configured to receive events 146 (event data) that are output from the ASR component 104 by dequeuing the events 146 (event data) from the ASR event queue 206, and to respond to the events 146 (event data) in various ways, depending on the type of events 146 it receives. In this sense, the consumer thread 148 is configured to pause, resume, and/or stop streaming of forthcoming audio data 118 to the ASR component 104 by issuing respective commands 150 to the streaming thread 144. The consumer thread 148 is also configured to pass (or otherwise input) ASR data 152 (e.g., text data) to the NLU component 106, to receive NLU data 156 from the NLU component 106, and to respond in various ways depending on the type of NLU data 156 received from the NLU component 106.

At 214, the request handler thread 200 may invoke the streaming thread 144 (e.g., via a "stream(reader, AsrEngineUpdateLock)" call), the streaming thread 144 configured to stream (or otherwise input) audio data 118 representing the user speech to the ASR component 104, such as by sequentially inputting audio data samples to the ASR component 104. The streaming thread 144 is also configured to receive commands 150 from the consumer thread 148 and to respond by pausing (or suspending), resuming, or stopping its streaming functionality, depending on the type of command 150 received from the consumer thread 148.

At 216, the streaming thread 144 may begin a session (e.g., by making a "beginSession" call to the ASR component 104. At 218, in response to a session being started, the ASR component 104 may emit a StartOfSpeech event 146 indicating that user speech has started. At 220, the ASR event queue producer 210 may enqueue the StartOfSpeech event 146 in the ASR event queue 206. At 222, the consumer thread 148 may dequeue the StartOfSpeech event 146 from the ASR event queue 206 to determine that the user speech has started.

At 224, the streaming thread 144 may input (or stream) a first audio data sample(s) to the ASR component 104. This first audio data sample(s) may have been buffered (along with one or more additional audio data samples received after the first audio data sample) as buffered audio data 154 before being inputted (or streamed) to the ASR component 104. "Buffering" the audio data 118, in this context, means storing the audio data in volatile memory of the speech interface device 102. The ASR component 104 may perform ASR processing on the first audio data sample(s), and, at 226, the ASR component 104 may generate (or emit) an EndOfSpeech event 146, which indicates the ASR component 104 has detected a breakpoint in the first audio data sample(s) where the user speech has stopped. The ASR component 104 may use any suitable endpointing model for this purpose. In some embodiments, the ASR component 104 may analyze the frequencies of the first audio data sample(s) to determine a frequency range that corresponds to a human voice, and may determine the breakpoint based at least in part on pause durations in that frequency range of the voice being analyzed. At 228, the EndOfSpeech event 146 may be enqueued in the ASR event queue 206. At 230, the EndOfSpeech event 146 may be dequeued from the ASR event queue 206, and thereby received by the consumer thread 148.

At 232, based at least in part on the receiving, by the consumer thread 148, of the EndOfSpeech event 146, the consumer thread 148 may execute an instruction (code), or a set of instructions (code), to pause the streaming of the audio data 118 to the ASR component 104 by causing the streaming thread 144 to cease inputting the audio data 118 to the ASR component 104. This may include the consumer thread 148 sending a command 150 to pause the streaming of audio data 118 to the ASR component 104. In response to the streaming thread 144 receiving the "pause" command 150 from the consumer thread 148, any forthcoming audio data 118 that has not already been input to the ASR component 104 is kept stored in the volatile memory buffer of the speech interface device 102. FIG. 2 depicts a buffer 234 that maintains the incoming audio data samples that have yet to be input to the ASR component 104. Accordingly, the buffer 234 may represent volatile memory of the speech interface device 102 where audio data may be stored. Thus, the buffer 234 may be, or include, a volatile memory buffer (e.g., a DRAM buffer). The buffer 234 can include any suitable form of volatile memory (e.g., volatile RAM) that is not used for persistent storage of data, but is used to temporarily store data until it is used, transmitted, deleted, and/or stored persistently. The size of the volatile memory (e.g., the buffer 234) that maintains the buffered audio data 154 may not be artificially limited other than by the amount of available memory on the speech interface device 102. Because it is likely that the ASR component 104 will be paused for, at most, 200 milliseconds (ms) at any given time during any local speech processing session, the speech interface device 102 is likely to possess a sufficient amount of volatile memory to maintain the buffered audio data 154 in the buffer 234 during such a timeframe. In some embodiments, the amount of available volatile memory on the speech interface device 102 may be sufficient to buffer at least 50 seconds of audio data, and oftentimes more than 50 seconds of audio data. It is also to be appreciated that the buffer 234 may be, or include, a secure portion of memory, such as a portion of memory that is protected from illicit access by a firewall, by encryption, or by other means of securely storing data.

It is to be appreciated that the configuration in FIG. 2 is merely an example. In the example of FIG. 2, at 236, before the streaming thread 144 received the pause command 150 from the consumer thread 148, the streaming thread 144 had had already inputted (or streamed) a second audio data sample(s) to the ASR component 104. Thus, there may be subsequently-received audio data samples (e.g., a third audio data sample, a fourth audio data sample(s), etc.) that are kept buffered based on the streaming thread 144 receiving the "pause" command 150 from the consumer thread 148. Following the streaming of the second audio data sample(s) to the ASR component 104, at 238, the ASR component 104 generates (or emits) a RecognitionResult event 146 that includes ASR data 152 (e.g., text data). At 240, the ASR event queue producer 210 enqueues the RecognitionResult event 146 in the ASR event queue 206. At 242, the consumer thread 148 dequeues the Recognition-Result event 146 from the ASR event queue 206, at which point the consumer thread 148 is in possession of ASR data 152 (e.g., text data) generated by the ASR component 104 based on ASR processing of the first and/or second audio data sample(s).

At 244, the consumer thread 148 inputs the ASR data 152 (e.g., text data) to the NLU component 106, and the NLU component 106 performs NLU processing on the ASR data 152 (e.g., text data) to generate NLU data 156. At 246, the NLU data 156 generated by the NLU component 106 is received by the consumer thread 148, and the consumer thread 148 may determine whether the NLU data 156 includes intent data corresponding to a recognized intent. In the example of FIG. 2, the ASR data 152 input to the NLU component 106 at 244 is the text data "Alexa," which may represent a wakeword. In this case, the wakeword itself does not correspond to a recognized intent that can be acted upon, and as such, this example NLU data 156 is considered to be "not intentful" in that the NLU component 106 fails to recognize an intent that can be acted upon.

At 248, in response to the consumer thread 148 determining that the NLU data 156 does not include intent data that corresponds to a recognized intent that can be acted upon, the consumer thread 148 may send a command 150, to the streaming thread 144, to resume streaming of the audio data 118 to the ASR component 104. At 250, the streaming thread 144 is configured to resume streaming from where it stopped by retrieving any audio data samples that were kept buffered in the volatile memory buffer (e.g., the buffer 234) as buffered audio data 154, and this retrieved audio data 118 is input (or streamed) to the ASR component 104 at 252. For example, a third audio data sample(s) may have been kept buffered based on the "pause" command from the consumer thread 148 at 232, and this third audio data sample(s) may be streamed (or otherwise input) to the ASR component 104 at 252.

At 254, in response to inputting the third audio data sample(s) to the ASR component 104, the ASR component 104 may perform ASR processing on the third audio data sample(s), and may emit an additional StartOfSpeech event 146 indicating that user speech has started for a second time. At 256, the ASR event queue producer 210 may enqueue the StartOfSpeech event 146 in the ASR event queue 206. At 258, the consumer thread 148 may dequeue the StartOfSpeech event 146 from the ASR event queue 206 to determine that the user speech has started for a second time.

At 260, the streaming thread 144 may input (or stream) a fourth audio data sample(s) to the ASR component 104. The ASR component 104 may perform ASR processing on the fourth audio data sample(s), and, at 262, the ASR component 104 may generate (or emit) an EndOfSpeech event 146, which indicates the ASR component 104 has detected a breakpoint in the third or fourth audio data sample(s) where the user speech has stopped. At 264, the EndOfSpeech event 146 may be enqueued in the ASR event queue 206. At 266, the EndOfSpeech event 146 may be dequeued from the ASR event queue 206, and received by the consumer thread 148.

At 268, based at least in part on the receiving, by the consumer thread 148, of the EndOfSpeech event 146, the consumer thread 148 may send an additional command 150 to pause the streaming of any forthcoming audio data 118 to the ASR component 104 that has not been input to the ASR component 104. In response to the streaming thread 144 receiving the additional "pause" command 150 from the consumer thread 148, any forthcoming audio data 118 that has not already been input to the ASR component 104 is kept stored in the volatile memory buffer of the speech interface device 102 (e.g., the buffer 234). In the example of FIG. 2, at 270, before the streaming thread 144 received the additional pause command 150 from the consumer thread 148, the streaming thread 144 had had already inputted (or streamed) a fifth audio data sample(s) to the ASR component 104. Following this, at 272, the ASR component 104 generates (or emits) an additional RecognitionResult event 146 that includes additional ASR data 152 (e.g., additional text data). At 274, the ASR event queue producer 210 enqueues the additional RecognitionResult event 146 in the ASR event queue 206. At 276, the consumer thread 148 dequeues the additional RecognitionResult event 146 from the ASR event queue 206, at which point the consumer thread 148 is in possession of the additional ASR data 152 (e.g., the additional text data) generated by the ASR component 104 based on ASR processing of the third, fourth, and/or fifth audio data sample(s).

At 278, the consumer thread 148 inputs the concatenated text data (e.g., the first text data: "Alexa" concatenated with the additional text data: "turn off the kitchen lights") to the NLU component 106, and the NLU component 106 performs NLU processing on the concatenated text data to generate additional NLU data 156.

At 280, the additional NLU data 156 generated by the NLU component 106 is received by the consumer thread 148, and the consumer thread 148 may determine whether the additional NLU data 156 includes intent data corresponding to a recognized intent. In the example of FIG. 2, the concatenated text data input to the NLU component 106 at 278 is the text data "Alexa turn off the kitchen lights," which may correspond to a "turn off" intent; an intent of a device control (or home automation) domain. This example NLU data 156 is considered to be "intentful" in that the NLU component 106 recognizes an intent that can be acted upon (e.g., to control one or more lights in the user's 108 kitchen by turning off the light(s)).

At 282, in response to the consumer thread 148 determining that the NLU data 156 includes intent data that corresponds to a recognized intent (that can be acted upon), the consumer thread 148 may send an additional command 150, to the streaming thread 144, to stop the streaming of any forthcoming audio data 118 to the ASR component 104. At 284, a speech recognition result (e.g., the NLU data 156 and/or data based on the NLU data 156) can be sent to the request handler thread 200, for output to the hybrid request selector 132 as local response data (e.g., local directive data generated based on the intent data).

At 286, in response to receiving a speech recognition result that is intentful, the buffer 234 can be cleared, whereby the buffered audio data 154 that has not been input to the ASR component 104, if any, is deleted from the volatile memory buffer of the speech interface device 102 without processing that audio data through the ASR component 104 or the NLU component 106. At 288, the streaming thread 144 may end the current session by issuing an "endSession" call to the ASR component 104. At 290, the streaming thread 144 may notify the request handler thread 200 that it is stopping its own execution, and at 292, the consumer thread 148 may do the same by notifying the request handler thread 200 that it too is stopping its own execution.

Although the illustrative example of FIG. 2 details a scenario where the NLU component 106 eventually recognizes an intent that can be acted upon, it is possible that the NLU component 106, in some cases, will fail to recognize an intent after processing all of the available audio data 118. At this point, the session would be ended in much the same way as in the example of FIG. 2, except that, instead of outputting a speech recognition result that is "intentful," the output from the local speech processing component 140 may be response data that indicates a failure to recognize an intent. In this scenario, remote response data (e.g., remote directive data) may have been received, which may be intentful, and, in this case, the hybrid request selector 132 may select the remote response data for use in responding to the user speech.

Figure 3:
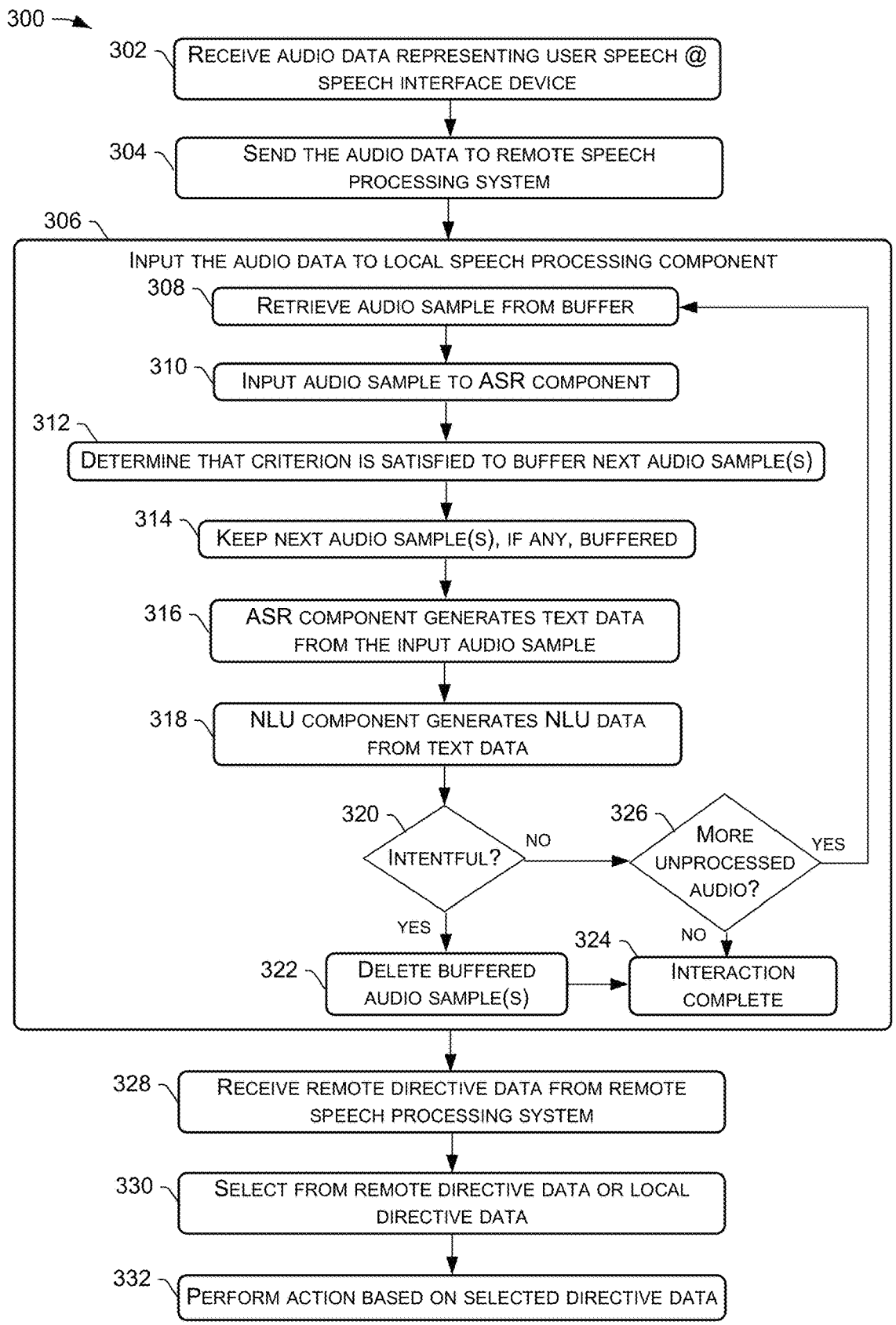
FIG. 3 is a flow diagram of an example process implemented by a speech interface device for keeping audio data buffered in a volatile memory buffer to pause an ASR component of the speech interface device while a NLU component of the speech interface device processes text data to generate NLU data for responding to user speech.

FIG. 3 is a flow diagram of an example process 300 implemented by a speech interface device 102 for keeping audio data 118 stored in a volatile memory buffer to pause an ASR component 104 of the speech interface device 102 while a NLU component 106 of the speech interface device 102 processes text data to generate NLU data 156 for responding to user speech. For discussion purposes, the process 300 is described with reference to the previous figures.

At 302, a voice services component 128 of the speech interface device 102 may receive audio data 118 that represents user speech. For example, the audio data 118 may be received via the SIM 126 component. In the example of FIG. 1, the audio data 118 received at 302 may represent an utterance, such as "Alexa, turn off the kitchen lights." Furthermore, as described above, this audio data 118 can also be partitioned into multiple audio samples. As such, the audio data 118 may include first audio data 118(1) (e.g., one or more first audio data samples corresponding to a first part of an utterance), second audio data 118(2) (e.g., one or more second audio data samples corresponding to a second, subsequent part of the same utterance, or corresponding to a different utterance), and so on. The number of audio data samples that are created may depend on the amount of audio data 118 generated (e.g., the number of samples may depend on the number of bytes of audio data).

At 304, the speech interface device 102 may send the audio data 118 to a remote speech processing system 124. For example, the audio data 118 (e.g., first audio data 118(1), second audio data 118(2), etc.) may be sent, via the HP 134 and the SCL 136 to the remote speech processing system 124 over the computer network 122.

At 306, the audio data 118 (e.g., first audio data 118(1), second audio data 118(2), etc.) may be input to the local speech processing component 140 of the speech interface device 102. This may be accomplished by the subcomponents of the hybrid request selector 132, and the inputting at block 306 may involve buffering (or otherwise storing), in a volatile memory buffer of the speech interface device 102, the audio data 118 as buffered audio data 154.

At sub-block 308, logic (e.g., the streaming thread 144) of the speech interface device 102 may retrieve, from the buffered audio data 154, first audio data 118(1) (e.g., one or more first audio data samples) that represents user speech.

At sub-block 310, logic (e.g., the streaming thread 144) of the speech interface device 102 may input the first audio data 118(1) (e.g., the one or more first audio data samples) to the ASR component 104 executing on the speech interface device 102.

At sub-block 312, logic (e.g., the consumer thread 148) of the speech interface device 102 may determine that a criterion is satisfied for maintaining any forthcoming audio data 118 that has not been input to the ASR component 104 in the volatile memory buffer of the speech interface device 102. In some embodiments, this criterion is satisfied if, after the ASR component 104 performs ASR processing on the first audio data 118(1), an event 146 (event data) is received (e.g., by the consumer thread 148 and from the ASR component 104) that indicates the ASR component 104 has detected a breakpoint (or a location) in the first audio data 118(1) where the user speech has stopped (e.g., the ASR component 104 has detected that the user stopped speaking). In other embodiments, one or more different criteria may be evaluated at block 312, such as whether the ASR component 104 has detected that the user speech has stopped (or some other point/location in the audio data), without reliance on sending a corresponding event 146 (event data) to the consumer thread 148.

At 314, based at least in part on the criterion being satisfied (e.g., based at least in part on receiving an EndOfSpeech event 146 from the ASR component 104 and thereby determining that the ASR component 104 has detected a breakpoint in the user speech), logic of the speech interface device 102 may keep buffered, in the volatile memory buffer of the speech interface device 102, second audio data 118(2) (e.g., one or more additional audio data samples) that represents the user speech and that has not been input to the ASR component 104. In other words, based on the criterion being satisfied, the buffered audio data 154 that has not yet been input to the ASR component 104 is kept buffered, without inputting that buffered audio data 154 to the ASR component 104.

At 316, the ASR component 104 may generate text data (ASR data 152) based at least in part on the first audio data 118(1). For example, the ASR component 104 may perform ASR processing on the first audio data 118(1), and may generate second event data, such as a second event 146 (received by the consumer thread 148) that includes text data and that indicates the ASR component 104 has recognized user speech in the first audio data 118(1).

At 318, the NLU component 106 may generate NLU data 156 based at least in part on the text data (ASR data 152). For example, the NLU component 106 may perform NLU processing on the text data (ASR data 152), and may generate the NLU data 156 that either includes intent data corresponding to a recognized intent, or does not include such intent data.

At 320, logic (e.g., the consumer thread 148) of the speech interface device 102 may determine whether the NLU data 156 includes intent data that corresponds to a recognized intent. If the NLU data 156 includes intent data that corresponds to a recognized intent, the second audio data 118(2) (which was kept buffered in the volatile memory buffer of the speech interface device 102) may be deleted at block 322 by following the "YES" route from block 320 to block 322.

At 324, the interaction may be completed (e.g., by the streaming thread 144 ending the session, as described with reference to FIG. 2). If, at block 320, it is determined that the NLU data 156 does not include intent data that corresponds to a recognized intent, the process 300 may follow the "NO" route from block 320 to block 326.

At 326, logic of the speech interface device 102 may determine if additional audio data 118 is available that has not been input to the ASR component 104. In the running example, the second audio data 118(2) was buffered in the volatile memory buffer of the speech interface device 102, so, in this scenario, the determination is an affirmative one at block 326, and the process 300 may follow the "YES" route from block 326 to block 308, where the buffered audio data (in this case, the second audio data 118(2), which is next in line after the first audio data 118(1)) may be retrieved from the volatile memory buffer of the speech interface device 102, and the process 300 may iterate blocks 310-320 by inputting the second audio data 118(2) to the ASR component 104 at block 310 and the subsequent operations at blocks 312-320 being performed on the basis of the second audio data 118(2) having been input to the ASR component 104.

At 320, if the additional NLU data 156 generated at block 318 on a subsequent iteration of the process 300 does not yield intent data corresponding to a recognized intent, the process 300 may continue to iterate from block 326 to block 308 so long as additional audio data 118 is available to process through the ASR component 104. However, if, at block 326, there is no more audio data 118 left to input to the ASR component 104, the process 300 may follow the "NO" route from block 326 to block 324, where the interaction is completed without recognizing an intent.

At 320, if the additional NLU data 156 generated at block 318 on the subsequent iteration of the process 300 yields intent data corresponding to a recognized intent, the process 300 follows the "YES" route from block 320 to block 322, where any buffered audio data 154 is deleted from the volatile memory buffer of the speech interface device 102, and the interaction is completed at block 324.

At 328, the speech interface device 102 may receive remote directive data from the remote speech processing system 124. For example, the voice services component 128 may receive, via the SCL 136 and over the computer network 122, the remote directive data, which is passed to the hybrid request selector 132.

At 330, logic (e.g., the hybrid request selector 132) of the speech interface device 102 may select at least one of the local directive data (assuming intentful NLU data 156 was generated locally, and local directive data was generated based on the intentful NLU data 156) or the remote directive data as selected directive data.

At 332, logic of the speech interface device 102 may perform an action based at least in part on the selected directive data. In the running example of FIG. 1, if the selected directive data includes instructions to turn off the kitchen lights, the speech interface device 102 may perform an action at block 332 by sending, via the communications interface 116, a command to a second device(s) (e.g., smart kitchen lights) collocated in the environment with the speech interface device 102, causing the second device(s) to "turn off."

Figure 4:
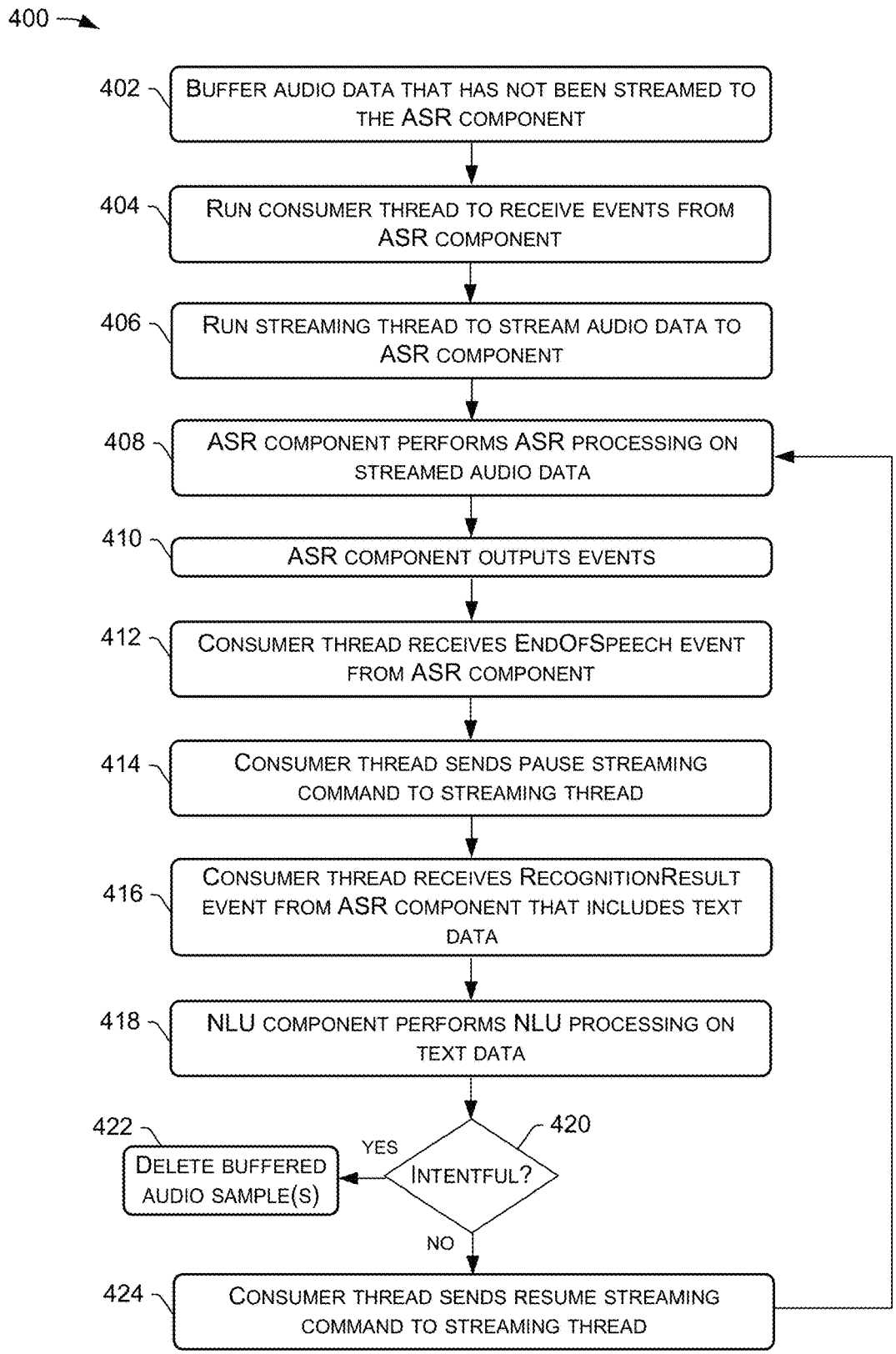
FIG. 4 is a flow diagram of an example process implemented by a speech interface device for executing a streaming thread and a consumer thread, and pausing the streaming of audio data to an ASR component of the speech interface device based on a command sent by the consumer thread to the streaming thread.

FIG. 4 is a flow diagram of an example process 400 implemented by a speech interface device 102 for executing a streaming thread 144 and a consumer thread 148, and pausing/resuming the streaming of audio data 118 to an ASR component 104 of the speech interface device by the consumer thread 148 sending commands 150 to the streaming thread 144. For discussion purposes, the process 400 is described with reference to the previous figures.

At 402, logic of the speech interface device 102 may buffer, in a volatile memory buffer of the speech interface device 102, audio data 118 that has not been streamed (e.g., input) to the ASR component 104. This buffering at block 402 may be a sub-operation of inputting the audio data 118 to the local speech processing component 140 of the speech interface device 102. That is, the incoming audio data 118 that is to be processed locally by the local speech processing component 140 can be buffered until the audio data 118 is streamed to the ASR component 104.

At 404, logic (e.g., the request handler thread 200) of the speech interface device may run (or execute) a consumer thread 148 (a first thread) on one or more processors of the speech interface device 102 to receive events 146 (event data) that are output from the ASR component 104. In some embodiments, the consumer thread 148 is configured to run on the one or more processors of the speech interface device 102 to receive the events 146 (event data) emitted (or output) from the ASR component 104, and to respond in various ways (e.g., by sending commands 150 to the streaming thread 144, and/or by forwarding ASR data 152 to the NLU component 106, etc.) depending on the type of event 146 received from the ASR component 104.

At 406, logic (e.g., the request handler thread 200) of the speech interface device 102 may run (or execute) a streaming thread 144 (a second thread) on one or more processors of the speech interface device 102 to stream (e.g., input) audio data 118 representing the user speech to the ASR component 104 of the speech interface device 102. The streaming thread 144 may be configured to retrieve audio data samples among the audio data 118 that was buffered at block 402. In some embodiments, the streaming thread 144 is configured to automatically input audio data samples to the ASR component 104 as long as audio data samples are received from the hybrid request selector 132 and buffered in the volatile memory buffer as the buffered audio data 154. Although the order in which the streaming thread 144 and the consumer thread 148 are invoked can vary by implementation, in some embodiments, the consumer thread 148 is invoked before the streaming thread 144 is invoked. The streaming thread 144 and the consumer thread 148 may execute concurrently (e.g., using a parallel multithreading implementation) and may share memory resources of the speech interface device 102, or the speech interface device 102 may execute each of the threads using time slicing, where a processor of the speech interface device 102 switches between executing the streaming thread 144 and the consumer thread 148.

At 408, the ASR component 104 may perform ASR processing on the audio data 118 that has been streamed (inputted) to the ASR component 104 by the streaming thread 144. The ASR processing performed at block 408 may include converting the audio data 118 into text data. For example, the ASR processing performed at block 408 may transcribe the audio data 118 into text data representing the words of the user speech contained in the audio data 118. In an illustrative example, a spoken utterance represented by the audio data 118 can be input to the ASR component 104, which then interprets the utterance based on the similarity between the utterance and pre-established language models available to the local speech processing component 140. For example, the ASR component 104 may compare the input audio data 118 with models for sounds (e.g., subword units or phonemes) and sequences of sounds to identify words that match the sequence of sounds spoken in the utterance of the audio data 118. In some embodiments, the ASR component 104 outputs the most likely text recognized in the audio data 118, or multiple hypotheses in the form of a lattice or an N-best list with individual hypotheses corresponding to confidence scores or other scores (such as probability scores, etc.).

At 410, the ASR component 104 may generate events 146 (event data) based at least in part on the ASR processing it performs on the audio data 118. For example, the ASR component 104 may emit a first type of event 146 (e.g., a "StartOfSpeech" event) that indicates the ASR component 104 has detected a point in the audio data 118 where the user speech has started (e.g., the ASR component 104 has detected that the user started speaking). The ASR component 104 may additionally, or alternatively, emit another type of event 146 (e.g., an "EndOfSpeech" event) that indicates the ASR component 104 has detected a breakpoint in the audio data 118 where the user speech has stopped (e.g., the ASR component 104 has detected that the user stopped speaking). The ASR component 104 may use any suitable endpointing model for this purpose. In some embodiments, the ASR component 104 may analyze the frequencies of the audio data 118 to determine a frequency range that corresponds to a human voice, and may determine the breakpoint based at least in part on pause durations in that frequency range of the voice being analyzed. The ASR component 104 may additionally, or alternatively, emit yet another type of event 146 (e.g., a "RecognitionResult" event) that includes text data and that indicates the ASR component 104 has recognized user speech in the audio data 118

At 412, the consumer thread 148 may receive event data, such as an event 146 (e.g., an EndOfSpeech event) that indicates the ASR component 104 has detected a breakpoint in the ASR-processed audio data 118 where the user speech has stopped. This is one example of how the consumer thread 148 may determine whether a criterion is satisfied for maintaining, in the volatile memory buffer of the speech interface device, any forthcoming audio data that has not been received by the ASR component 104.

At 414, the consumer thread 148 may execute an instruction (code), or a set of instructions (code), such as by calling a method ( ) to pause audio streaming, which causes the streaming thread 144 to cease inputting the audio data 118 (e.g., forthcoming audio data 118) to the ASR component 104 based at least in part on receiving the EndOfSpeech event 146. For example, the consumer thread 148 may cause the streaming thread 144 to cease inputting the audio data 118 to the ASR component 104 by sending, to the streaming thread 144, a command 150 to pause (or suspend) the streaming of any forthcoming audio data 118 to the ASR component 104.

At 416, the consumer thread 148 may receive additional event data, such as an additional event 146 (e.g., a RecognitionResult event) that includes text data (ASR data 152). Again, the text data included in the RecognitionResult event may be generated by converting the audio data 118 into text data. For example, the ASR component 104 may transcribe the audio data 118 into text data representing the words of the user speech contained in the audio data 118. In an illustrative example, a spoken utterance represented by the audio data 118 can be input to the ASR component 104, which then interprets the utterance based on the similarity between the utterance and pre-established language models available to the local speech processing component 140. For example, the ASR component 104 may compare the input audio data 118 with models for sounds (e.g., subword units or phonemes) and sequences of sounds to identify words that match the sequence of sounds spoken in the utterance of the audio data 118. In some embodiments, the text data included in the RecognitionResult event includes the most likely text recognized in the audio data 118, or multiple hypotheses in the form of a lattice or an N-best list with individual hypotheses corresponding to confidence scores or other scores (such as probability scores, etc.).

At 418, the NLU component 106 may perform NLU processing on the text data (ASR data 152) to generate NLU data 156. The NLU data 156 may include intent data and/or slot data, which may be further processed to generate directives that cause the speech interface device 102 to perform an action(s). Generally, the NLU component 106 takes textual input (such as text data generated by the ASR component 104) and attempts to make a semantic interpretation of the ASR text data. That is, the NLU component 106 determines the meaning behind the ASR text data based on the individual words, and then the NLU component 106 can implement that meaning. The NLU component 106 interprets a text string to derive an intent or a desired action or operation from the user 108. This may include deriving pertinent pieces of information in the text that allow the NLU component 106 to identify a second device in the environment, if the user, for example, intends to control a second device (e.g., a light(s) in the user's 108 house, as is the case in the example of FIG. 1). The local speech processing component 140 may also provide a dialog management function to engage in speech dialogue with the user 108 to determine (e.g., clarify) user intents by asking the user 108 for information using speech prompts.

At 420, logic (e.g., the consumer thread 148) of the speech interface device 102 may determine whether the NLU data 156 generated by the NLU component 106 includes intent data corresponding to a recognized intent. If, at block 420, the NLU data 156 includes intent data corresponding to a recognized intent, the process 400 may follow the "YES" route from block 420 to block 422, where any buffered audio data 154 is deleted from the volatile memory buffer of the speech interface device 102.

If, at block 420, the NLU data 156 does not include intent data corresponding to a recognized intent (e.g., a failure to recognize an intent), the process 400 may follow the "NO" route from block 420 to block 424, where the consumer thread 148 may cause the streaming thread 144 to resume inputting the audio data 118 to the ASR component 104. The consumer thread 148 may cause the streaming thread 144 to resume the inputting of the audio data 118 to the ASR component 104 by sending, to the streaming thread 144, a command 150 to resume (or continue) the streaming of any forthcoming audio data 118 to the ASR component 104, starting with the buffered audio data 154 that has been buffered the longest, and then continuing with the more recently-buffered audio data. The process 400 may therefore iterate blocks 408 through 420, until an intent is recognized, or until there is no more audio data to process through the ASR component 104.

Figure 5:
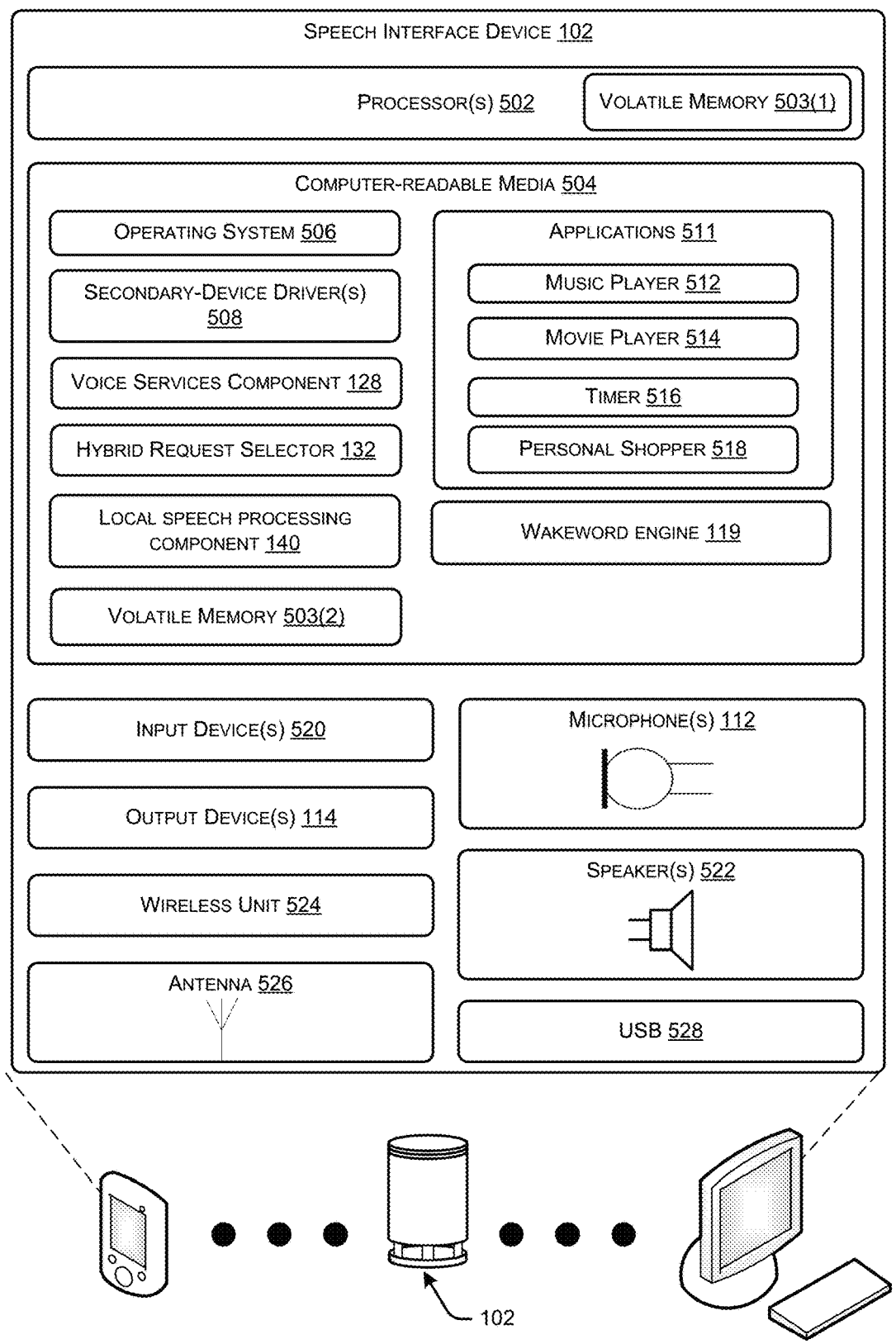
FIG. 5 illustrates example components of an electronic device, such as the speech interface device of FIG. 1.

FIG. 5 illustrates example components of an electronic device, such as the speech interface device 102 of FIG. 1. The speech interface device 102 may be implemented as a standalone device that is relatively simple in terms of functional capabilities with limited input/output components, memory, and processing capabilities. For instance, the speech interface device 102 may not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 502 and computer-readable media 504 (often referred to herein as "memory" of the speech interface device 102, and/or "local memory" of the speech interface device 102). In some implementations, the processors(s) 502 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 502 may possess its own local memory, which also may store program modules, program data and/or other data, and/or one or more operating systems. For example, the processor(s) 502 may include volatile memory 503(1), which may be used to store at least a portion of the audio data 118 before the audio data 118 is input to the ASR component 104. As such, the volatile memory 503(1) may be, or include, a volatile memory buffer (e.g., a dynamic random-access memory (DRAM) buffer), of the speech interface device 102, such as the buffer 234, or at least a portion thereof. Such a volatile memory buffer can include any suitable form of volatile memory (e.g., volatile RAM) that is not used for persistent storage of data, but is used to temporarily store data until it is used, transmitted, deleted, and/or stored persistently. The size of the volatile memory 503(1) (e.g., the volatile memory buffer) that is configured to maintain the buffered audio data 154 may not be artificially limited other than by the amount of available memory on the speech interface device 102. Because it is likely that the ASR component 104 will be paused for, at most, 200 milliseconds (ms) at any given time during any local speech processing session, the volatile memory 503(1) may be of a size that is suitable to maintain the buffered audio data 154 during such a timeframe. In some embodiments, the volatile memory 503(1), either alone or in combination with additional volatile memory 503(2), may be sufficient to buffer at least 50 seconds of audio data, and oftentimes more than 50 seconds of audio data. It is also to be appreciated that the volatile memory 503(1) may be a secure portion of memory on the speech interface device 102, such as a portion of memory that is protected from illicit access by a firewall, by encryption, or by other means of securely storing data.

The computer-readable media 504 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 504 may be implemented as computer-readable storage media ("CRSM"), which may be any available physical media accessible by the processor(s) 502 to execute instructions stored on the memory 504. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 502.

Several modules such as instruction, datastores, and so forth may be stored within the computer-readable media 504 and configured to execute on the processor(s) 502. A few example functional modules are shown as applications stored in the computer-readable media 504 and executed on the processor(s) 502, although the same functionality may alternatively be implemented in hardware, firmware, or as a system on a chip (SOC). At least some of the components and/or threads shown in FIGS. 1 and/or 2 may also be stored in the computer-readable media 504 and/or executable by the processor(s) 502 to implement the functionality described herein. For example, the voice services component 128, the hybrid request selector 132, and the local speech processing component 140, as well as their subcomponents, may be stored in the computer-readable media 504 and executable by the processor(s) 502 to implement the functionality described herein.

An operating system module 506 may be configured to manage hardware within and coupled to the speech interface device 102 for the benefit of other modules. In addition, the speech interface device 102 may include one or more secondary-device drivers 508 for sending control commands to second devices collocated in an environment with the speech interface device 102. The speech interface device 102 may further including the aforementioned wakeword engine 119.

The speech interface device 102 may also include a plurality of applications 511 stored in the computer-readable media 504 or otherwise accessible to the speech interface device 102. In this implementation, the applications 511 are a music player 512, a movie player 514, a timer 516, and a personal shopper 518. However, the speech interface device 102 may include any number or type of applications and is not limited to the specific examples shown here. The music player 512 may be configured to play songs or other audio files. The movie player 514 may be configured to play movies or other audio visual media. The timer 516 may be configured to provide the functions of a simple timing device and clock. The personal shopper 518 may be configured to assist a user in purchasing items from web-based merchants. When implementing the "hybrid" functionality described herein, where a remote system 120 is unavailable to the speech interface device 102, these applications 511 may be configured to access local resources (e.g., local music or movie libraries, a local shopping list, a local calendar, etc.). In some cases, changes made to these local resources may be synched with remote versions of those resources when the remote system 120 subsequently becomes available to the speech interface device 102.

The computer-readable media 504 may further include volatile memory 503(2). The volatile memory 503(2) may be used to store at least a portion of the audio data 118 before the audio data 118 is input to the ASR component 104. As such, the volatile memory 503(2) may be, or include, a volatile memory buffer (e.g., a dynamic random-access memory (DRAM) buffer), of the speech interface device 102, such as the buffer 234, or at least a portion thereof. Such a volatile memory buffer can include any suitable form of volatile memory (e.g., volatile RAM) that is not used for persistent storage of data, but is used to temporarily store data until it is used, transmitted, deleted, and/or stored persistently. The size of the volatile memory 503(2) (e.g., the volatile memory buffer) that is configured to maintain the buffered audio data 154 may not be artificially limited other than by the amount of available memory on the speech interface device 102. Because it is likely that the ASR component 104 will be paused for, at most, 200 milliseconds (ms) at any given time during any local speech processing session, the volatile memory 503(2) may be of a size that is suitable to maintain the buffered audio data 154 during such a timeframe. In some embodiments, the volatile memory 503(2), either alone or in combination with additional volatile memory 503(1), may be sufficient to buffer at least 50 seconds of audio data, and oftentimes more than 50 seconds of audio data. It is also to be appreciated that the volatile memory 503(2) may be a secure portion of memory on the speech interface device 102, such as a portion of memory that is protected from illicit access by a firewall, by encryption, or by other means of securely storing data.

Generally, the speech interface device 102 has input devices 520 and output devices 114. The input devices 520 may include, without limitation, a keyboard, keypad, mouse, touch screen, joystick, control buttons, etc. In some implementations, one or more microphones 112, introduced in FIG. 1, may function as input devices 520 to receive audio input, such as user voice input. The output device(s) 114, introduced in FIG. 1, may include, without limitation, a display(s), a light element (e.g., LED), a vibrator to create haptic sensations, or the like. In some implementations, one or more speakers 522 may function as output devices 114 to output audio sounds (e.g., audio content, TTS responses, tones at various frequencies, etc.).

A user 108 may interact with the speech interface device 102 by speaking to it, and the one or more microphone(s) 112 captures the user's speech (utterances). The speech interface device 102 can communicate back to the user 108 by emitting audible statements through the speaker(s) 522. In this manner, the user 108 can interact with the speech interface device 102 solely through speech, without use of a keyboard or display.

The speech interface device 102 may further include a wireless unit 524 coupled to an antenna 526 to facilitate a wireless connection to a network. The wireless unit 524 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 122. As such, the speech interface device 102 may be configured to act as a hub that can communicate with second devices in the environment and control the second devices, such as by using protocol stacks, drivers, and adapters to communicate over a suitable communications protocol. A USB port(s) 528 may further be provided as part of the speech interface device 102 to facilitate a wired connection to a network, or a plug-in network device that communicates with other wireless networks. In addition to the USB port 528, or as an alternative thereto, other forms of wired connections may be employed, such as a broadband connection, Transmission Control Protocol/Internet Protocol (TCP/IP) protocol connection, etc. The communications interface 116 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 112. Further, there may be no output such as a display for text or graphical output. The speaker(s) 522 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A speech interface device comprising:
one or more processors;
volatile memory; and
non-transitory computer-readable memory storing computer-executable instructions that, when executed by the one or more processors, cause performance of operations comprising:
storing first audio data in the volatile memory prior to an automatic speech recognition (ASR) component executing on the speech interface device receiving the first audio data, the first audio data representing user speech;
storing second audio data in the volatile memory prior to the ASR component receiving the second audio data, the second audio data representing the user speech;
executing, on the one or more processors, a thread for inputting the first audio data and the second audio data, in sequence, to the ASR component;
receiving the first audio data by the ASR component;
performing, using the ASR component, ASR processing on the first audio data;
receiving, from the ASR component, first event data that indicates the ASR component has detected a breakpoint in the first audio data where the user speech has stopped;
in response to the receiving of the first event data from the ASR component, maintaining the second audio data in the volatile memory by instructing the thread to cease the inputting;
receiving, from the ASR component, second event data that includes text data;
after the instructing of the thread to cease the inputting, performing, using a natural language understanding (NLU) component executing on the speech interface device, NLU processing on the text data;
receiving, from the NLU component, NLU data; and
deleting the second audio data from the volatile memory based at least in part on a determination that the NLU data includes intent data that corresponds to a recognized intent.

2. The speech interface device of claim 1, wherein the thread is a first thread, the operations further comprising:
executing, on the one or more processors, a second thread to receive the first event data and the second event data from the ASR component by retrieving the first event data and the second event data from an ASR event queue; and
in response to the second thread receiving the first event data, executing, by the second thread, an instruction to cause the instructing of the first thread to cease the inputting,
wherein the maintaining the second audio data in the volatile memory is based at least in part on the second thread executing the instruction.

3. The speech interface device of claim 1, the operations further comprising:
storing, in the volatile memory, third audio data that represents the user speech prior to the ASR component receiving the third audio data;
storing, in the volatile memory, fourth audio data that represents the user speech prior to the ASR component receiving the fourth audio data;
receiving the third audio data by the ASR component;
performing, using the ASR component, ASR processing on the third audio data;
receiving, from the ASR component, third event data that indicates the ASR component has detected a breakpoint in the third audio data where the user speech has stopped;
in response to the receiving of the third event data from the ASR component, maintaining the fourth audio data in the volatile memory;
receiving, from the ASR component, fourth event data that includes second text data;
performing, using the NLU component, NLU processing on the second text data;
receiving, from the NLU component, second NLU data; and
receiving the fourth audio data by the ASR component based at least in part on a determination that the second NLU data does not include intent data that corresponds to a recognized intent.

4. The speech interface device of claim 3, the operations further comprising:
performing, using the ASR component, ASR processing on the fourth audio data;
receiving, from the ASR component, fifth event data that includes third text data;
concatenating the second text data and the third text data as concatenated text data; and
performing, using the NLU component, NLU processing on the concatenated text data to generate third NLU data that includes second intent data corresponding to a second recognized intent.

5. A method, comprising:
storing, in volatile memory of a speech interface device, first audio data and second audio data that represents user speech;
executing a thread on the speech interface device for inputting the first audio data and the second audio data to an automatic speech recognition (ASR) component of the speech interface device;
receiving the first audio data by the ASR component;
determining that a criterion is satisfied;
based at least in part on the criterion being satisfied, maintaining the second audio data in the volatile memory of the speech interface device by instructing the thread to cease the inputting;
generating, by the ASR component, text data based at least in part on the first audio data;
after the instructing of the thread to cease the inputting, generating, by a natural language understanding (NLU) component executing on the speech interface device, NLU data based at least in part on the text data; and
determining that the NLU data includes intent data that corresponds to a recognized intent; and
deleting the second audio data from the volatile memory of the speech interface device.

6. The method of claim 5, wherein the determining that the criterion is satisfied is subsequent to receiving, from the ASR component, first event data that indicates the ASR component has detected a breakpoint in the first audio data where the user speech has stopped.

7. The method of claim 6, wherein the thread is a first thread, the method further comprising:
executing, on one or more processors of the speech interface device, a second thread to receive the first event data from the ASR component; and
wherein the instructing of the first thread to cease the inputting is based at least in part on the second thread receiving the first event data.

8. The method of claim 5, further comprising:
sending, by the speech interface device, the first audio data to a remote speech processing system;
receiving, by the speech interface device, first directive data from the remote speech processing system;
generating, by the speech interface device, second directive data based at least in part on the intent data;
selecting, by the speech interface device, at least one of the second directive data or the first directive data as selected directive data; and
performing, by the speech interface device, an action based at least in part on the selected directive data.

9. The method of claim 5, wherein the first audio data includes one or more first audio data samples corresponding to a first part of an utterance and the second audio data includes one or more second audio data samples corresponding to a second, subsequent part of the utterance.

10. The method of claim 5, further comprising:
storing, in the volatile memory of the speech interface device, third audio data and fourth audio data that represents the user speech;
receiving the third audio data by the ASR component;
determining, after the receiving of the third audio data by the ASR component, that the criterion is satisfied for a second time;
based at least in part on the criterion being satisfied for the second time, maintaining the fourth audio data in the volatile memory of the speech interface device;
generating, by the ASR component, second text data based at least in part on the third audio data;
generating, by the NLU component, second NLU data based at least in part on the second text data;
determining that the second NLU data does not include intent data that corresponds to a recognized intent; and
receiving the fourth audio data by the ASR component.

11. The method of claim 10, further comprising:
generating, by the ASR component, third text data based at least in part on the fourth audio data;
concatenating the second text data and the third text data as concatenated text data;
generating, by the NLU component, third NLU data based at least in part on the concatenated text data; and
determining that the third NLU data includes second intent data that corresponds to a second recognized intent.

12. The method of claim 11, further comprising:
sending, by the speech interface device, the third audio data and the fourth audio data to a remote speech processing system;
receiving, by the speech interface device, first directive data from the remote speech processing system;
generating, by the speech interface device, second directive data based at least in part on the second intent data;
selecting, by the speech interface device, at least one of the second directive data or the first directive data as selected directive data; and
performing, by the speech interface device, an action based at least in part on the selected directive data.

13. A speech interface device comprising:
one or more processors;
volatile memory; and
non-transitory computer-readable memory storing computer-executable instructions that, when executed by the one or more processors, cause performance of operations comprising:
storing, in the volatile memory of the speech interface device, first audio data and second audio data that represents user speech;
executing a thread for inputting the first audio data and the second audio data to an automatic speech recognition (ASR) component of the speech interface device;
receiving the first audio data by the ASR component;
determining that a criterion is satisfied;
based at least in part on the criterion being satisfied, maintaining the second audio data in the volatile memory by instructing the thread to cease the inputting;
generating, by the ASR component, text data based at least in part on the first audio data;
after the instructing of the thread to cease the inputting, generating, by a natural language understanding (NLU) component executing on the speech interface device, NLU data based at least in part on the text data;
instructing the thread to resume the inputting based at least in part on a determination that the NLU data does not include intent data that corresponds to a recognized intent; and
receiving the second audio data by the ASR component.

14. The speech interface device of claim 13, wherein the determining that the criterion is satisfied is subsequent to receiving, from the ASR component, first event data that indicates the ASR component has detected a location in the first audio data where the user speech has stopped.

15. The speech interface device of claim 14, wherein the thread is a first thread, the operations further comprising:
executing, on the one or more processors, a second thread to receive the first event data from the ASR component; and
wherein the instructing of the first thread to cease the inputting is based at least in part on the second thread receiving the first event data.

16. The speech interface device of claim 13, wherein the first audio data includes one or more first audio data samples corresponding to a first part of an utterance and the second audio data includes one or more second audio data samples corresponding to a second, subsequent part of the utterance.

17. The speech interface device of claim 13, the operations further comprising:
determining, after the receiving of the second audio data by the ASR component, that the criterion is satisfied for a second time;
generating, by the ASR component, second text data based at least in part on the second audio data;
concatenating the text data and the second text data as concatenated text data; and
generating, by the NLU component, additional NLU data based at least in part on the concatenated text data.

18. The speech interface device of claim 17, the operations further comprising:

sending, by the speech interface device, the first audio data and the second audio data to a remote speech processing system;
receiving, by the speech interface device, first directive data from the remote speech processing system;
determining that the additional NLU data includes the intent data corresponding to the recognized intent;
generating, by the speech interface device, second directive data based at least in part on the intent data;
selecting, by the speech interface device, at least one of the second directive data or the first directive data as selected directive data; and
performing, by the speech interface device, an action based at least in part on the selected directive data.

19. The speech interface device of claim 17, wherein the storing further includes storing, in the volatile memory, third audio data that represents the user speech, the operations further comprising:
based at least in part on the criterion being satisfied for the second time, maintaining the third audio data in the volatile memory; and
deleting the third audio data from the volatile memory based at least in part on a determination that the additional NLU data includes the intent data that corresponds to the recognized intent.

20. The speech interface device of claim 13, wherein the ASR component is finished processing the first audio data at a time at which the NLU component is processing the text data to generate the NLU data.

* * * * *